(12) United States Patent
Lin et al.

(10) Patent No.: US 11,137,858 B2
(45) Date of Patent: Oct. 5, 2021

(54) LOCATION-BASED SWING COMPENSATION FOR TOUCH CHANNEL ATTENUATION

(71) Applicant: Apple Inc., Cupertino, CA (US)

(72) Inventors: Albert Lin, Cupertino, CA (US);
Shwetabh Verma, Los Altos, CA (US);
Sumant Ranganathan, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 17 days.

(21) Appl. No.: 15/698,471

(22) Filed: Sep. 7, 2017

(65) Prior Publication Data

US 2018/0088735 A1 Mar. 29, 2018

Related U.S. Application Data

(60) Provisional application No. 62/399,317, filed on Sep. 23, 2016.

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 2203/04108* (2013.01)

(58) Field of Classification Search
CPC ...... G06F 3/041; G06F 3/0412; G06F 3/0416; G06F 3/0418; G06F 3/044;

(Continued)

(56) References Cited

U.S. PATENT DOCUMENTS

| 5,287,108 A | 2/1994 | Mayes et al. |
| 5,483,261 A | 1/1996 | Yasutake |

(Continued)

FOREIGN PATENT DOCUMENTS

| JP | 2000-163031 A | 6/2000 |
| JP | 2002-342033 A | 11/2002 |

OTHER PUBLICATIONS

Final Office Action dated Mar. 18, 2016 for U.S. Appl. No. 14/205,125, filed Mar. 11, 2014, nine pages.

(Continued)

*Primary Examiner* — Nathan Danielsen
(74) *Attorney, Agent, or Firm* — Kubota & Basol LLP

(57) ABSTRACT

Location-based swing compensation for touch sensor panels can improve touch sensing performance. Due to differences in impedance characteristics of touch nodes at different locations in a touch sensor panel (due to differences in routing to touch nodes and due to differences in impedance with respect to ground (loading effects) of touch nodes), touch nodes can have non-uniform bandwidth characteristics which can manifest as non-uniform signal and signal-to-noise ratio (SNR) across the touch sensor panel. Additionally, the non-uniform signal can reduce the effectiveness of bootstrapping. Swing compensated stimulation signals can be applied to various touch nodes based on location and/or impedance characteristics of the various touch nodes. For example, the stimulation voltage can be increased for touch nodes with longer and/or thinner routing traces so that the signal at the touch node can be uniform with other touch nodes whose routing may be shorter and/or thicker. In some examples, a touch sensing system can include a swing compensation memory including swing compensation parameters to select stimulation signal swing for transmit channels.

18 Claims, 14 Drawing Sheets

(58) Field of Classification Search
CPC .......... G06F 3/04101; G06F 3/04103; G06F 3/04104; G06F 3/04108
See application file for complete search history.

(56) References Cited

U.S. PATENT DOCUMENTS

| | | | |
|---|---|---|---|
| 5,488,204 A | 1/1996 | Mead et al. | |
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,643,011 B2 | 1/2010 | O'Connor et al. | |
| 7,663,607 B2 | 2/2010 | Hotelling et al. | |
| 7,692,638 B2 | 4/2010 | Land et al. | |
| 8,031,094 B2 | 10/2011 | Hotelling et al. | |
| 8,035,622 B2 | 10/2011 | Hotelling et al. | |
| 8,125,456 B2 | 2/2012 | Krah et al. | |
| 8,125,464 B2 | 2/2012 | Land et al. | |
| 8,237,667 B2 | 8/2012 | Krah | |
| 8,479,122 B2 | 7/2013 | Hotelling et al. | |
| 8,487,893 B2 | 7/2013 | Crandall et al. | |
| 8,525,532 B2 | 9/2013 | Ningrat | |
| 8,592,697 B2 | 11/2013 | Hotelling et al. | |
| 8,890,854 B2 | 11/2014 | Tenuta et al. | |
| 8,913,021 B2 | 12/2014 | Elias et al. | |
| 8,988,384 B2 | 3/2015 | Krah et al. | |
| 9,086,768 B2 | 7/2015 | Elias et al. | |
| 9,158,393 B2 | 10/2015 | Vlasov | |
| 10,156,940 B2 | 12/2018 | Krah | |
| 2006/0197753 A1 | 9/2006 | Hotelling | |
| 2008/0158175 A1 | 7/2008 | Hotelling et al. | |
| 2009/0189867 A1 | 7/2009 | Krah et al. | |
| 2010/0060593 A1 | 3/2010 | Krah | |
| 2011/0061947 A1 | 3/2011 | Krah et al. | |
| 2011/0061948 A1 | 3/2011 | Krah et al. | |
| 2011/0061949 A1* | 3/2011 | Krah ..................... G06F 3/0418 178/18.06 |
| 2012/0050213 A1 | 3/2012 | Bokma et al. | |
| 2012/0139846 A1* | 6/2012 | Krah ..................... G06F 3/044 345/173 |
| 2012/0162089 A1 | 6/2012 | Chang | |
| 2012/0268397 A1 | 10/2012 | Lee et al. | |
| 2013/0069904 A1* | 3/2013 | Krah ..................... G06F 3/0418 345/174 |
| 2013/0076646 A1 | 3/2013 | Krah et al. | |
| 2013/0176274 A1* | 7/2013 | Sobel ..................... G06F 3/0416 345/174 |
| 2013/0176275 A1 | 7/2013 | Weaver et al. | |
| 2014/0049509 A1 | 2/2014 | Shepelev et al. | |
| 2014/0049510 A1 | 2/2014 | Chung et al. | |
| 2014/0057681 A1 | 2/2014 | Grivas et al. | |
| 2014/0104231 A1 | 4/2014 | Hu | |
| 2015/0035787 A1 | 2/2015 | Shahparnia et al. | |
| 2015/0035797 A1* | 2/2015 | Shahparnia ............. G06F 3/041 345/174 |
| 2015/0061985 A1* | 3/2015 | Sugiyama ............... G06F 3/044 345/87 |
| 2015/0116267 A1 | 4/2015 | Inoue et al. | |
| 2015/0227229 A1* | 8/2015 | Schwartz ................ G06F 3/044 345/174 |
| 2015/0261340 A1 | 9/2015 | Krah | |
| 2016/0005352 A1* | 1/2016 | Kim ....................... G06F 3/044 345/212 |
| 2016/0092029 A1* | 3/2016 | Kim ..................... G06F 3/0418 345/174 |
| 2016/0239136 A1* | 8/2016 | Kocak ................... G06F 3/0412 |

OTHER PUBLICATIONS

Final Office Action dated May 26, 2017 for U.S. Appl. No. 14/205,125, filed Mar. 11, 2014, nine pages.
Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
Non-Final Office Action dated Sep. 18, 2015, for U.S. Appl. No. 14/205,125, filed Mar. 11, 2014, eight pages.
Non-Final Office Action dated Oct. 7, 2016 for U.S. Appl. No. 14/205,125, filed Mar. 11, 2014, twelve pages.
Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.
Rubine, D.H. (May 1992). "Combining Gestures and Direct Manipulation," CHI '92, pp. 659-660.
Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.
Notice of Allowance dated Sep. 17, 2018, for U.S. Appl. No. 14/205,125, filed Mar. 11, 2014, nine pages.
Examiner's Answer to Appeal Brief received for U.S. Appl. No. 14/205,125, dated Apr. 19, 2018, 9 pages.
Oxford Dictionary—Definition of Word "Gain", Available online at: <https://www.lexico.com/en/definition/gain>, Accessed on Aug. 8, 2019, 3 pages.

\* cited by examiner

LOCATION-BASED SWING COMPENSATION FOR TOUCH CHANNEL ATTENUATION

CROSS-REFERENCE TO RELATED APPLICATIONS

This application claims benefit of U.S. Provisional Patent Application No. 62/399,317, filed Sep. 23, 2016, which is hereby incorporated by reference in its entirety.

FIELD OF THE DISCLOSURE

This relates generally to touch-sensitive devices, and more particularly to location-based swing compensation for touch channel attenuation.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch. Thereafter, the computing system can perform one or more actions based on the touch. In the case of some touch sensing systems, a physical touch on the display may not be needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of substantially transparent or non-transparent conductive plates made of materials such as Indium Tin Oxide (ITO). It is due in part to their substantial transparency that capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

SUMMARY OF THE DISCLOSURE

This relates to location-based swing compensation for touch sensor panels. Due to differences in impedance characteristics of touch nodes at different locations in a touch sensor panel (due to differences in routing to touch nodes and due to differences in impedance with respect to ground (loading effects) of touch nodes), touch nodes can have non-uniform bandwidth characteristics which can manifest as non-uniform signal and signal-to-noise ratio (SNR) across the touch sensor panel. In addition to non-uniform performance, the non-uniform signal can reduce the effectiveness of bootstrapping. Swing compensated stimulation signals can be applied to various touch nodes based on location and/or impedance characteristics of the various touch nodes. For example, the stimulation voltage can be increased for touch nodes with longer and/or thinner routing traces so that the signal at the touch node can be uniform with other touch nodes whose routing may be shorter and/or thicker. In some examples, a touch sensing system can include a swing compensation memory including swing compensation parameters, which can control the swing of the stimulation signals output by each transmit channel. In some examples, the swing compensation parameters can adjust the gain of an output buffer of respective transmit channels. In some examples, the swing compensation parameters can adjust the digital waveform(s), digital-to-analog converter (DAC) codes, and/or one or more DACs to generated swing compensated stimulation signals.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to location-based swing compensation for touch sensor panels. Due to differences in impedance characteristics of touch nodes at different locations in a touch sensor panel (due to differences in routing to touch nodes and due to differences in impedance with respect to ground (loading effects) of touch nodes), touch nodes can have non-uniform bandwidth characteristics which can manifest as non-uniform signal and signal-to-noise ratio (SNR) across the touch sensor panel. In addition to non-uniform performance, the non-uniform signal can reduce the effectiveness of bootstrapping. Swing compensated stimulation signals can be applied to various touch nodes based on location and/or impedance characteristics of the various touch nodes. For example, the stimulation voltage can be increased for touch nodes with longer and/or thinner routing traces so that the signal at the touch node can be uniform with other touch nodes whose routing may be shorter and/or thicker. In some examples, a touch sensing system can include a swing compensation memory including swing compensation parameters, which can control the swing of the stimulation signals output by each transmit channel. In some examples, the swing compensation parameters can adjust the gain of an output buffer of respective transmit channels. In some examples, the swing compensation parameters can adjust the digital waveform(s), digital-to-analog converter (DAC) codes, and/or one or more DACs to generated swing compensated stimulation signals.

Figure 1A:
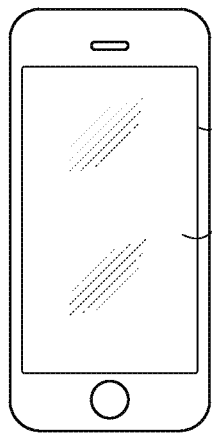
FIGS. 1A-1E illustrate exemplary systems with touch screens that can implement location-based swing compensation according to examples of the disclosure.
Figure 1B:
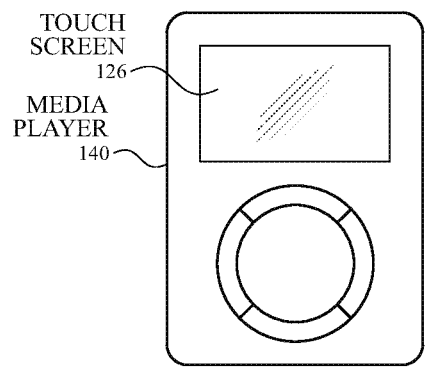
Figure 1C:
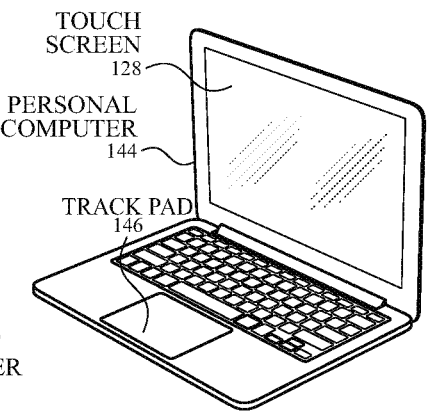
Figure 1D:
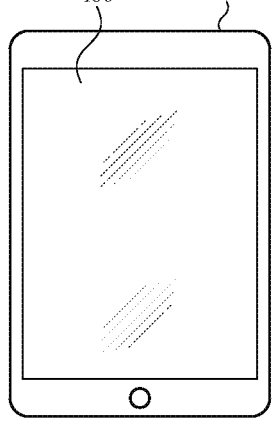
Figure 1E:
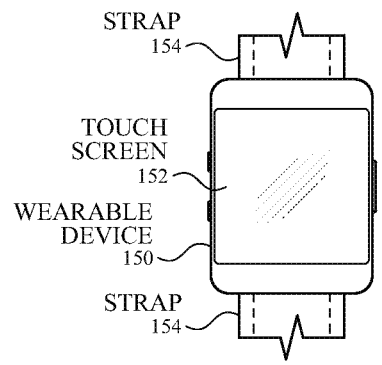

FIGS. 1A-1E illustrate exemplary systems with touch screens that can implement location-based swing compensation according to examples of the disclosure. FIG. 1A illustrates an exemplary mobile telephone 136 that includes a touch screen 124 and can implement location-based swing compensation according to examples of the disclosure. FIG. 1B illustrates an example digital media player 140 that includes a touch screen 126 and can implement location-based swing compensation according to examples of the disclosure. FIG. 1C illustrates an example personal computer 144 that includes a touch screen 128 and a track pad 146 and can implement location-based swing compensation according to examples of the disclosure. FIG. 1D illustrates an example tablet computing device 148 that includes a touch screen 130 and can implement location-based swing compensation according to examples of the disclosure. FIG. 1E illustrates an example wearable device 150 (e.g., a watch) that includes a touch screen 152 and can implement location-based swing compensation according to examples of the disclosure. Wearable device 150 can be coupled to a user via strap 154 or any other suitable fastener. It should be understood that the example devices illustrated in FIGS. 1A-1E are provided by way of example, and other types of devices can implement location-based swing compensation according to examples of the disclosure. Additionally, although the devices illustrated in FIGS. 1A-1E include touch screens, in some examples, location-based swing compensation according to examples of the disclosure can be implemented for touch sensor panels without a display (e.g., track pad 146).

In some examples, touch screens 124, 126, 128, 130 and 152 can be based on self-capacitance or mutual capacitance. A touch system can include a matrix of small plates of conductive material that can be referred to as a touch pixel, touch node, or a touch pixel electrode (as described below with reference to touch screen 220 in FIG. 2). For example, a touch screen can include a plurality of individual touch nodes, each touch node identifying or representing a unique location on the touch screen at which touch or proximity (hovering) (i.e., a touch or proximity event) is to be sensed, and each touch node being electrically isolated from the other touch nodes in the touch screen/panel. Such a touch screen can be referred to as a pixelated touch screen. During self-capacitance operation of the pixelated touch screen, a touch node can be stimulated with an AC waveform, and the self-capacitance of the touch node can be measured. As an object approaches the touch node, the self-capacitance to ground of the touch node can change. This change in the self-capacitance of the touch node can be detected and measured by the touch sensing system to determine the positions of multiple objects when they touch, or come in proximity to, the touch screen. In some examples, the electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

Figure 2:
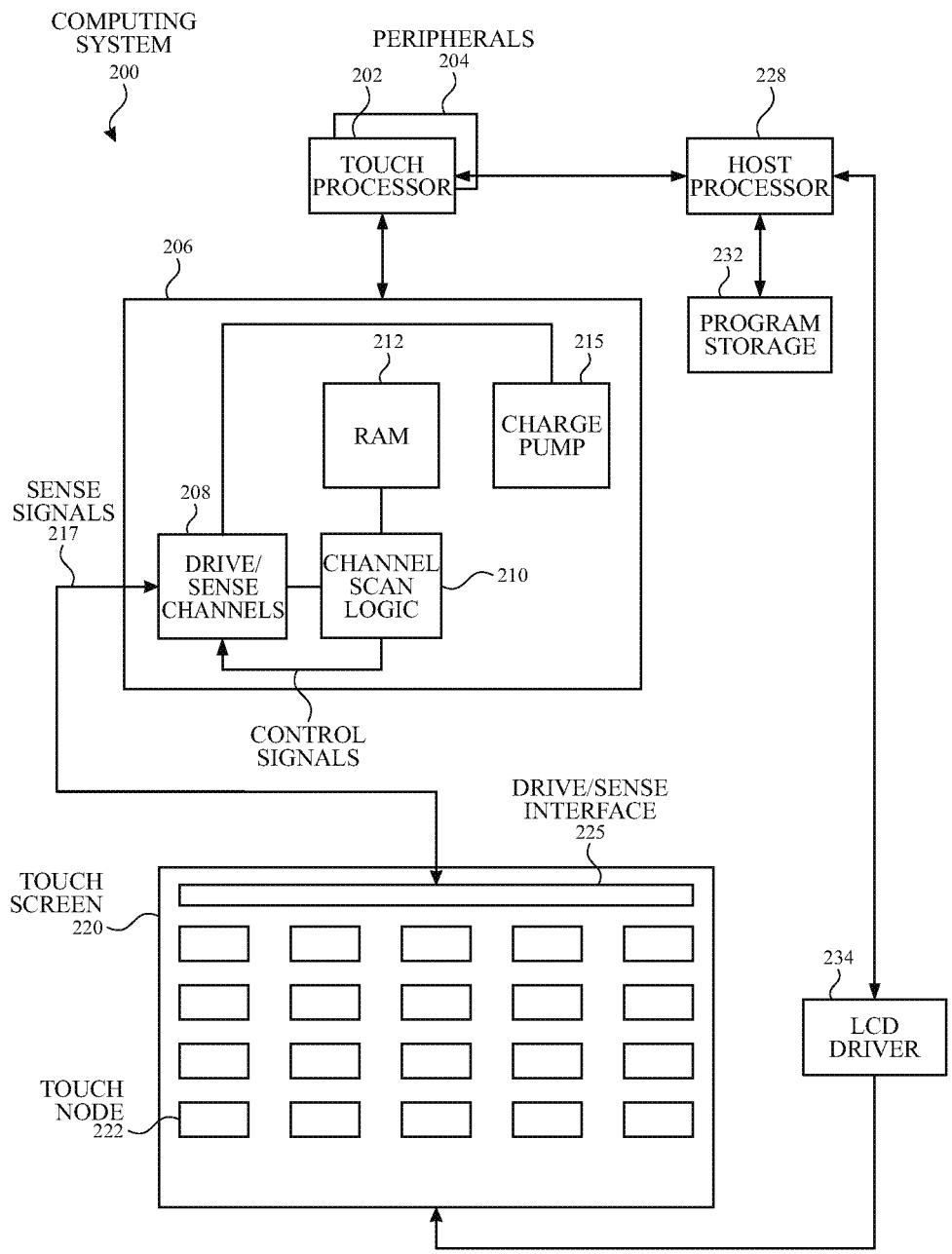
FIG. 2 is a block diagram of an exemplary computing system including a touch screen that can implement location-based swing compensation according to examples of the disclosure.

FIG. 2 is a block diagram of an exemplary computing system 200 including a touch screen 220 that can implement location-based swing compensation according to examples of the disclosure. Computing system 200 can be included in, for example, mobile telephone 136, digital media player 140, personal computer 144, tablet computing device 148, wearable device 150, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more drive/sense channels 208 and channel scan logic 210. Channel scan logic 210 can access RAM 212, autonomously read data from drive/sense channels 208 and provide control for drive/sense channels 208. In addition, channel scan logic 210 can control drive/sense channels 208 to generate stimulation signals at various frequencies and phases that can be selectively applied to the touch nodes of touch screen 220, as described in more detail below. The various scans performed by the touch controller can be selected and sequenced according to a scan plan. In some examples, touch controller 206, touch processor 202 and peripherals 204 can be integrated into a single application specific integrated circuit (ASIC), and in some examples can be integrated with touch screen 220 itself.

Touch screen 220 can be a self-capacitance touch screen and can include touch sensing circuitry that can include a capacitive sensing medium having a plurality of touch nodes 222 (e.g., a pixelated touch screen). Touch nodes 222 can be coupled to drive/sense channels 208 in touch controller 206, can be driven by stimulation signals from drive/sense channels 208 through drive/sense interface 225, and can be sensed by drive/sense channels 208 through the drive/sense interface as well, as described herein for a self-capacitance operation. Labeling the conductive plates used to detect touch (i.e., touch nodes 222) as "touch pixel" electrodes can be particularly useful when touch screen 220 is viewed as capturing an "image" of touch. In other words, after touch controller 206 has determined an amount of touch detected at each touch node 222 in touch screen 220, the pattern of touch nodes in the touch screen at which a touch occurred can be thought of as an "image" of touch (e.g., a pattern of fingers touching the touch screen).

Computing system 200 can also include a host processor 228 for receiving outputs from touch processor 202 and performing actions based on the outputs. For example, host processor 228 can be connected to program storage 232 and a display controller, such as an LCD driver 234. The LCD driver 234 can provide voltages on select (gate) lines to each pixel transistor and can provide data signals along data lines to these same transistors to control the pixel display image as described in more detail below. Host processor 228 can use LCD driver 234 to generate a display image on touch screen 220, such as a display image of a user interface (UI), and can use touch processor 202 and touch controller 206 to detect a touch on or near touch screen 220. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, including the configuration and operation of electrodes and drive/sense channels, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Figure 3A:
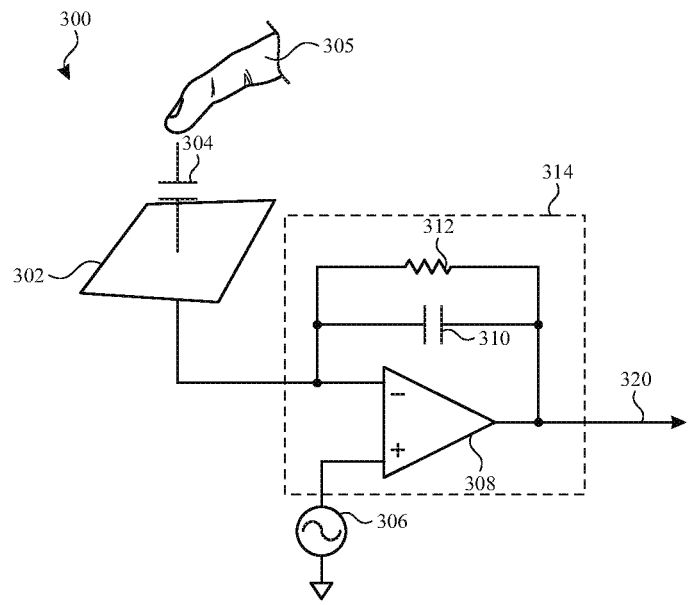
FIG. 3A illustrates an exemplary touch sensor circuit corresponding to a self-capacitance touch node and sensing circuit according to examples of the disclosure.

FIG. 3A illustrates an exemplary touch sensor circuit 300 corresponding to a self-capacitance touch node 302 and sensing circuit 314 according to examples of the disclosure. Touch node 302 can correspond to touch node 222 (illustrated in FIG. 2). Touch node 302 can have an inherent self-capacitance to ground associated with it, and also an additional self-capacitance to ground that is formed when an object, such as finger 305, is in proximity to or touching the electrode. The total self-capacitance to ground of touch node 302 can be illustrated as capacitance 304. Touch node 302 can be coupled to sensing circuit 314 (which can correspond to drive/sense channels 208 illustrated in FIG. 2). Sensing circuit 314 can include an operational amplifier 308, feedback resistor 312, feedback capacitor 310 and an input voltage source 306, although other configurations can be employed. For example, feedback resistor 312 can be replaced by a switched capacitor resistor in order to minimize any parasitic capacitance effect caused by a variable feedback resistor. Touch node 302 can be coupled to the inverting input of operational amplifier 308. An AC voltage source 306 (Vac) can be coupled to the non-inverting input of operational amplifier 308. Touch sensor circuit 300 can be configured to sense changes in the total self-capacitance 304 of the touch node 302 induced by a finger or object either touching or in proximity to the touch sensor panel. Output 320 can be used by a processor (e.g., touch controller 206 illustrated in FIG. 2) to determine the presence of a touch event, or the output can be inputted into a discrete logic network to determine the presence of a touch or proximity event. It is understood that a "touch event," as used in this disclosure, encompasses a finger or object touching the touch sensor panel (i.e., being in physical contact with the touch sensor panel), as well as the finger or object being in proximity to, but not touching, the touch sensor panel (e.g., hovering over the touch sensor panel). Touch sensor circuit 300 can represent the structure and/or operation of touch node self-capacitance sensing of the examples of the disclosure.

Figure 3B:
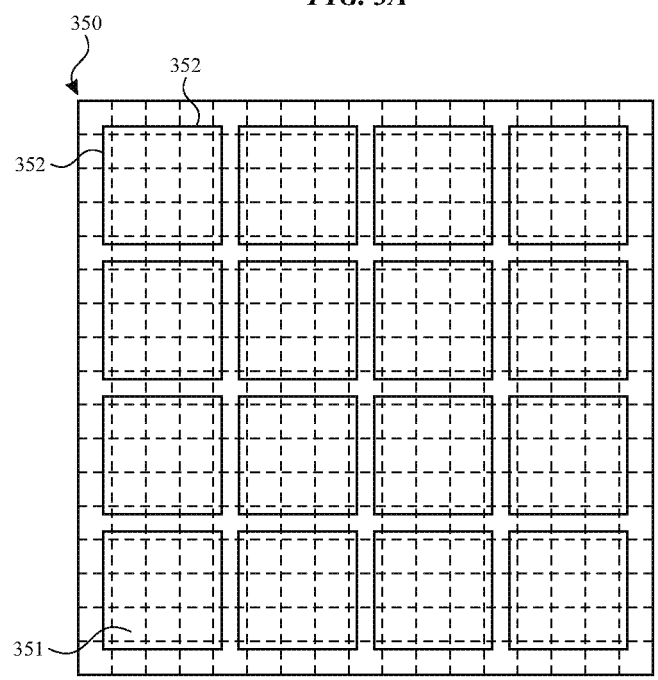
FIG. 3B illustrates an example configuration in which common electrodes can form portions of the touch sensing circuitry of a touch sensing system according to examples of the disclosure.

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (e.g., OLED displays), such as one or more display pixel transistors (e.g., thin film transistors (TFTs)), gate lines, data lines, display pixel electrodes and common electrodes. In any given display pixel, a voltage between a display pixel electrode and a common electrode can control a luminance of the display pixel. The voltage on the display pixel electrode can be supplied by a data line through a display pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. FIG. 3B illustrates an example configuration in which common electrodes 352 can form portions of the touch sensing circuitry of a touch sensing system—in some examples of this disclosure, the common electrodes can form touch nodes used to detect an image of touch on touch screen 350, as described above. Each common electrode 352 (i.e., touch node) can include a plurality of display pixels 351. Each display pixel 351 can include a portion of a common electrode 352, which can be a circuit element of the display system circuitry in the display pixel stack-up (i.e., the stacked material layers forming the display pixels) of the display pixels of some types of LCD or other displays that can operate as part of the display system to display a display image.

In the example shown in FIG. 3B, each common electrode 352 can serve as a multi-function circuit element that can operate as display circuitry of the display system of touch screen 350 and can also operate as touch sensing circuitry of the touch sensing system. In this example, each common electrode 352 can operate as a common electrode of the display circuitry of the touch screen 350, as described above, and can also operate as touch sensing circuitry of the touch screen. For example, a common electrode 352 can operate as a capacitive part of a touch node of the touch sensing circuitry during the touch sensing phase. Other circuit elements of touch screen 350 can form part of the touch sensing circuitry by, for example, switching electrical connections, etc. More specifically, in some examples, during the touch sensing phase, a gate line can be connected to a power supply, such as a charge pump, that can apply a voltage to maintain TFTs in display pixels included in a touch node in an "off" state. Stimulation signals can be applied to common electrode 352. Changes in the total self-capacitance of common electrode 352 can be sensed through an operational amplifier, as previously discussed. The change in the total self-capacitance of common electrode 352 can depend on the proximity of a touch object, such as a finger, to the common electrode. In this way, the measured change in total self-capacitance of common electrode 352 can provide an indication of touch on or near the touch screen.

In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multi-function circuit element that can operate as display circuitry and perform one or more other functions, such as operating as touch sensing circuitry, or may be a single-function circuit element that can operate as display circuitry only. Therefore, in some examples, some of the circuit elements in the display pixel stack-ups can be multi-function circuit elements and other circuit elements may be single-function circuit elements. In other examples, all of the circuit elements of the display pixel stack-ups may be single-function circuit elements.

In addition, although examples herein may describe the display circuitry as operating during a display phase and may describe the touch sensing circuitry as operating during a touch sensing phase, it should be understood that a display phase and a touch sensing phase may be operated at the same time, e.g., partially or completely overlap, or the display phase and touch sensing phase may operate at different times. Also, although examples herein describe certain circuit elements as being multi-function and other circuit elements as being single-function, it should be understood that the circuit elements are not limited to the particular functionality in other examples. In other words, a circuit element that is described in one example herein as a single-function circuit element may be configured as a multi-function circuit element in other examples, and vice versa.

The common electrodes 352 (i.e., touch nodes) and display pixels 351 of FIG. 3B are shown as rectangular or square regions on touch screen 350. However, it is understood that the common electrodes 352 and display pixels 351 are not limited to the shapes, orientations, and positions shown, but can include any suitable configurations according to examples of the disclosure.

While the discussion in this disclosure focuses on touch screens, it is understood that some or all of the examples of the disclosure can similarly be implemented in a touch sensor panel (i.e., a panel having touch sensing circuitry without display circuitry). For brevity, however, some of the examples of the disclosure have been, and will be, described in the context of a touch screen.

In self-capacitance based touch screens, any capacitance seen by a self-capacitance touch node can affect the total self-capacitance measured at that touch node, and can thus affect touch measurements at that touch node. Therefore, in some examples, it can be beneficial to "bootstrap" the touch screen in order to reduce or cancel any unwanted capacitances that may contribute to the total self-capacitance measured at a touch node. "Bootstrapping" the touch screen can entail driving one or more portions of a touch screen with a voltage at the same frequency and phase as is used to drive and sense a touch node (as described above), so that capacitances that may exist between the touch node, and the one or more portions of the touch screen can be effectively canceled. Although referred to herein using the term "bootstrapping," driving one or more portions of the touch screen with a voltage at the same frequency and phase as is used to drive the touch node can also be referred to as "guarding" (and the driven but not sensed touch nodes can be referred to as a "driven guard").

Figure 4B:
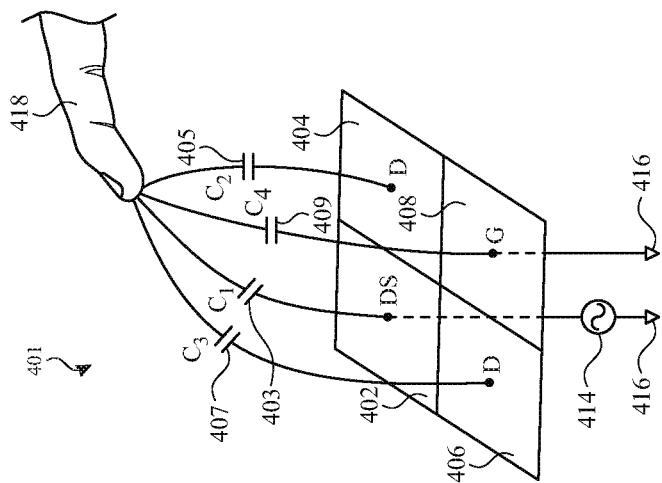
FIG. 4B illustrates an exemplary partially-bootstrapped touch screen in which less than all of the touch nodes can be driven simultaneously according to examples of the disclosure.
Figure 4A:
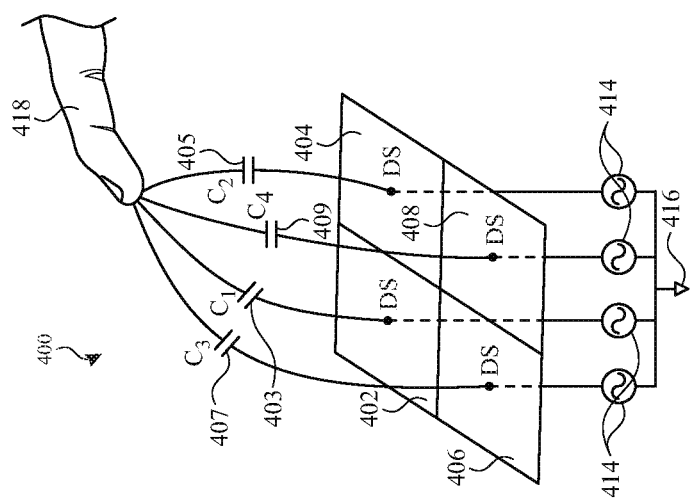
FIG. 4A illustrates an exemplary fully-bootstrapped touch screen in which every touch node can be driven simultaneously according to examples of the disclosure.

FIG. 4A illustrates an exemplary fully-bootstrapped touch screen 400 in which every touch node can be driven simultaneously. Touch screen 400 can include touch nodes 402, 404, 406 and 408. Touch nodes 402, 404, 406 and 408 can be a portion of the touch nodes that can be included in touch screen 400. Other touch nodes are omitted for ease of description, but it is understood that the scope of the disclosure includes touch screens that include more than four touch nodes. When extended to larger touch screens, the configuration of four touch nodes illustrated in FIG. 4A can be replicated for the remaining touch nodes of the panel.

Each of touch nodes 402, 404, 406 and 408 can be driven and sensed (signified by "DS") simultaneously (or driven simultaneously and sensed sequentially) with the same stimulation signal from stimulation sources 414, which can be coupled to the system ground 416 of whichever device touch screen 400 can be included in (e.g., any of the devices illustrated in FIGS. 1A-1E). Stimulation sources 414 can each correspond to sensing circuit 314 and/or voltage source 306 in FIG. 3A. Because each of touch nodes 402, 404, 406 and 408 can be driven and sensed simultaneously (or driven simultaneously and sensed sequentially) with the same stimulation signal, capacitances that may exist between the touch nodes can be effectively canceled, and the sensed total self-capacitances of the touch nodes can be limited to the capacitances that can exist between the touch nodes and finger (or object) 418, and potentially other capacitances (e.g., parasitic capacitances) that may exist between the touch nodes and other system components (e.g., system ground). These capacitances can be represented by $C_1$ 403, $C_2$ 405, $C_3$ 407 and $C_4$ 409.

In some examples, partially-bootstrapped scans, rather than fully-bootstrapped scans of the touch screen can be performed (e.g., to achieve better performance when poorly grounded objects contact the touch screen). FIG. 4B illustrates an exemplary partially-bootstrapped touch screen 401 in which fewer than all of the touch nodes can be driven simultaneously. Touch screen 401 can be the same as touch screen 400, except that instead of all of touch nodes 402, 404, 406 and 408 being driven and sensed simultaneously as in touch screen 400, only touch node 402 can be driven and sensed in touch screen 401. Touch nodes 404 and 406 can be driven but not sensed (signified by "D"), and touch node 408 can be grounded (signified by "G") to system ground 416. Though not illustrated for clarity, touch nodes 404 and 406 can be coupled to a stimulation source to be driven by the same stimulation signal as can be driving touch node 402. Additionally, it is understood that in touch screens that have more touch nodes than those illustrated in FIG. 4B, the DS, D and G touch node pattern can be repeated across some or all of the touch screen in accordance with the examples of the disclosure.

Partially-bootstrapped touch screen 401 can exhibit most if not all of the benefits of fully-bootstrapped touch screen 400. Specifically, capacitances between touch node 402 (the touch node of interest—i.e., the touch node for which the total self-capacitance is being sensed) and touch nodes 404 and 406 can continue to be effectively canceled, because touch nodes 402, 404 and 406 can be driven with the same stimulation signal. Capacitances between touch node 402 and touch node 408 may not be canceled because touch node 408 can be coupled to system ground 416; however, because touch nodes 402 and 408 can be diagonally disposed with respect to one another, any capacitances that may exist (e.g., near field mutual capacitances) between the two can be relatively small. Therefore, the total self-capacitance sensed at touch node 402 can be substantially free of capacitances that may exist between touch node 402 and the other touch nodes, which can be one benefit of a fully-bootstrapped touch screen.

Figure 5:
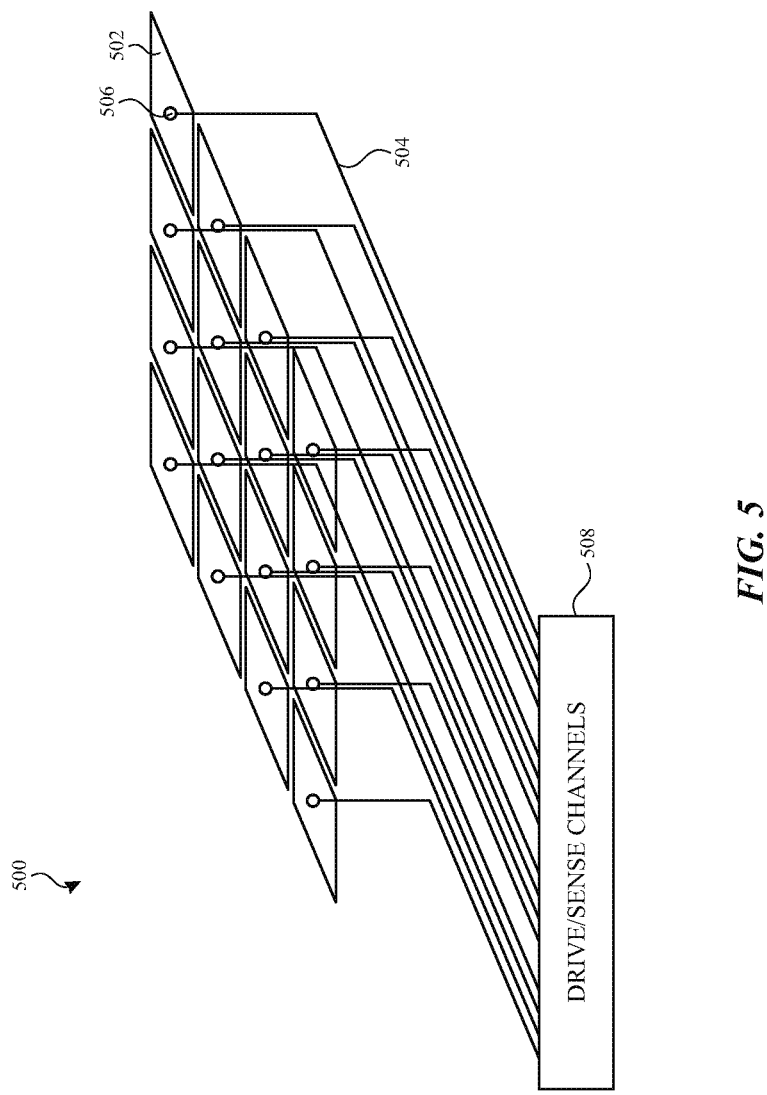
FIG. 5 illustrates an exemplary configuration for electrically connecting touch nodes in a touch screen to drive/sense channels according to examples of the disclosure.

FIG. 5 illustrates an exemplary configuration for electrically connecting touch nodes in a touch screen 500 to drive/sense channels 508 according to examples of the disclosure. Touch screen 500 can include touch nodes 502, as described above. Components of touch screen 500 other than touch nodes 502 are not illustrated for simplicity. Each of touch nodes 502 can be electrically connected to drive/sense channels 508 through drive/sense connections 504 and vias 506. Vias 506 can allow for an electrical connection between touch nodes 502 and drive/sense connections 504 through one or more intervening layers that may exist between the touch nodes and the drive/sense connections 504 in touch screen 500. Selective placement of drive/sense connections 504 and vias 506 in relation to other components of touch screen 500 can reduce optical effects the drive/sense connections and vias may have on an image displayed on the touch screen. Further, in some examples, drive/sense connections 504 can be made to be relatively "deep" (i.e., far from touch nodes 502 and display pixel components) in the stack-up of touch screen 500 so as to reduce parasitic effects that the drive/sense connections 504 might have on the operation of the touch nodes 502 and/or any other components of the touch screen.

As illustrated in FIG. 5, due to the spatial distribution of touch nodes in touch screen 500, the routing of drive/sense connections 504 (also referred to herein as routing or routing traces) can be different. In some examples, routing traces can be of different length for different touch nodes. In some examples, routing traces can be of different geometry (e.g., different thickness). As a result of the impedance characteristics of the routing traces, the differences in the length and geometry of the routing traces between touch nodes can result in non-uniform performance for a touch sensor panel. Additionally, different impedances with respect to ground (loading effects) of touch nodes at different locations can result in non-uniform performance for a touch sensor panel. In particular, in the case of bootstrapped touch sensor panels, the non-uniformity can affect the cancellation of parasitic capacitances between electrodes of a touch sensor panel. For example, when uniform amplitude stimulation signals are applied to touch nodes of a touch sensor panel, some touch nodes may receive a stimulation signal with relatively more attenuation than other touch nodes. As a result, the signal-to-noise ratio (SNR) may not be uniform across the touch sensor panel.

Touch sensor panels, such as those described above, can be characterized with a bandwidth. The bandwidth can be defined as the range of frequencies over which the touch sensor panel can generate signals without a threshold amount of signal attenuation (e.g., in the resulting capacitance measurements). The performance of the touch sensing system can depend on the amount of attenuation permitted in the system (e.g., 1 dB, 3 dB, 5 dB, etc.). Operating the touch sensing system (e.g., generating a stimulation signal with a fundamental operating frequency) within the bandwidth of the sensor can provide stable performance without attenuation of the signals sensed by the touch sensing system (or with less than a threshold amount of attenuation). However, the bandwidth of touch nodes of the touch sensor panel can be spatially dependent (e.g., due to differences in routing between the touch controller and touch nodes). Thus, in order to meet the performance requirements, a conventional touch sensing system can either lower the operating frequency so all touch nodes can be operating within the worse-case bandwidth of a touch node of the touch sensor panel or increase the swing (voltage amplitude) of the applied stimulation signals (thereby increasing the signal to meet the SNR performance). In some instances, reducing the operating frequency can limit operating bandwidth available to avoid known interferers or to reduce noise from interferers, and increasing the swing across the touch sensor panel can increase power consumption for the device (i.e., in an inefficient manner when not all touch nodes require the same increase in swing, if any).

In examples described herein, the swing of the stimulation signals can be adjusted based on the spatial distribution of the touch nodes to compensate for the non-uniform bandwidth in a power efficient way. For example, a touch sensor panel routing layout can be characterized, and variable required swing of stimulation signals can be determined based on the routing characteristics to provide a uniform SNR performance, as described in more detail below.

Figure 6:
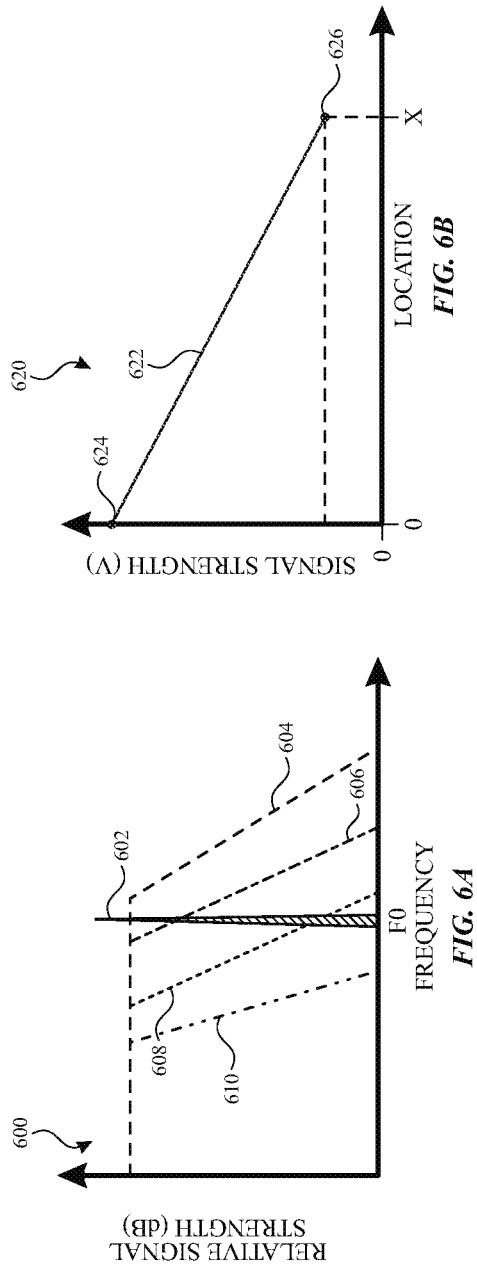
FIG. 6A illustrates a plot of bandwidth for various touch nodes at various locations in a touch sensor panel according to examples of the disclosure.
FIG. 6B illustrates an exemplary plot of spatial distribution of signal strength for an exemplary routing scheme according to examples of the disclosure.
FIG. 6C illustrates an exemplary plot of spatial distribution of signal strength for another exemplary routing scheme according to examples of the disclosure.

FIG. 6A illustrates a plot 600 of bandwidth for various touch nodes at various locations in a touch sensor panel according to examples of the disclosure. Four exemplary bandwidths 604, 606, 608 and 610 are illustrated in FIG. 6A, where bandwidth 604 can correspond to a "best case" bandwidth, and bandwidth 610 can correspond to a "worse case" bandwidth. For example, touch nodes coupled to a touch controller with thinner and/or longer routing traces can have a relatively low bandwidth compared to the bandwidth of touch nodes whose routing traces can be wider and/or shorter. Operating the touch sensing system (e.g., generating a stimulation signal with a fundamental operating frequency) at frequency $f_0$ 602 can result in some touch nodes (e.g., those corresponding to bandwidth 604, for example) operating within the performance specifications. In some instances, those touch nodes with bandwidths corresponding to bandwidths 606, 608 and 610 can be operating outside of the performance specifications. For example, the attenuation of the signals at the touch nodes with bandwidth below frequency $f_0$ can result in reduced signal and thus reduced SNR performance. Overall, the operating at frequency $f_0$ can result in non-uniform touch sensing performance.

As discussed herein, the bandwidth can be a function of the routing characteristics. FIG. 6B illustrates an exemplary plot 620 of spatial distribution of signal strength for an exemplary routing scheme according to examples of the disclosure. The spatial distribution in plot 620 can correspond to routing all connections to one side of the touch sensor panel. For example, signal strength curve 622 can be maximum at point 624, which can correspond to a touch node with a routing distance near zero. Signal strength curve 622 can be minimum at point 626, which can be at a maximum routing distance X. It should be understood that plot 620 presumes a uniform trace thickness, but that trace thickness can change the signal strength and spatial distribution as well. Although signal strength curve 622 is illustrated as having a linear characteristic as routing distance increases, it should be understood that signal strength curve 622 can have a non-linear characteristic. FIG. 6C illustrates an exemplary plot 630 of spatial distribution of signal strength for another exemplary routing scheme according to examples of the disclosure. The spatial distribution in plot 630 can correspond to routing connections symmetrically routed to opposite sides of the touch sensor panel. For example, signal strength curve 632 can be maximum at points 634 and 638, which can correspond to touch nodes with a routing distance near zero (as measured from the edges of the touch sensor panel). Signal strength curve 632 can be minimum at point 636, which can be at a maximum routing distance X/2. In should be understood that plot 630 presumes a uniform trace thickness, but that trace thickness can change the signal strength and spatial distribution as well. Although signal strength curve 632 is illustrated as having a linear characteristic as routing distance increases toward the center of the touch sensor panel, it should be understood that signal strength curve 632 can have a non-linear characteristic.

As discussed above, in some examples, the performance of the touch sensor panel can have improved uniformity when stimulation signals applied to touch nodes are swing compensated based on the location and/or routing distance of the touch nodes. For example, the swing of stimulation signals applied to a touch node corresponding to point 626 in plot 620 can be increased relative to the stimulation signals applied to a touch node corresponding to point 624 in plot 620. Likewise, the amount of swing at an touch node corresponding to a point along the center of signal strength curve 622 can be relatively larger than the swing of the stimulation signals applied to a touch node corresponding to point 624 and can be relatively smaller than the swing of the stimulation signals applied to a touch node corresponding to point 626. Increasing the stimulation signal swing based on the spatial distribution of electrodes can result in a uniform signal strength at each touch node, which can result in more uniform touch sensing performance and improved bootstrapping cancellation of parasitic capacitances.

Figure 7:
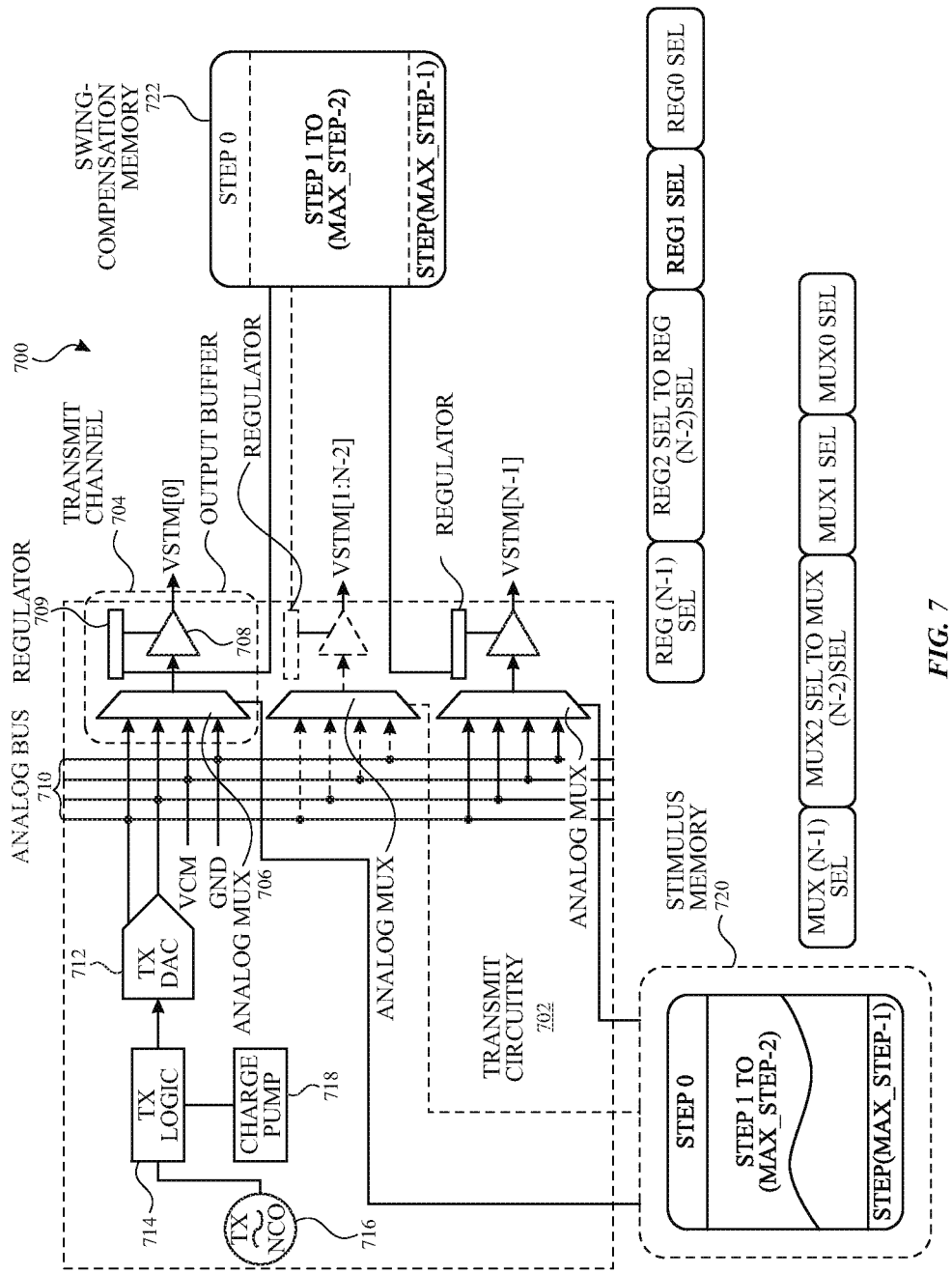
FIG. 7 illustrates an exemplary block diagram including components configured to implement location-based swing compensation according to examples of the disclosure.

In some examples, each transmit channel (e.g., the transmit portion of a transmit/receive channel) can be provided with output buffer control. FIG. 7 illustrates an exemplary block diagram 700 including components configured to implement location-based swing compensation according to examples of the disclosure. A touch controller (e.g., corresponding to touch controller 206 illustrated in FIG. 2) can include transmit circuitry 702, stimulus memory 720 and swing compensation memory 722. Transmit circuitry 702 can include transmit logic 714 (TX logic) (which can be powered in part by charge pump 718), which can be configured to generate a digital transmit waveform based on a transmit oscillator (TX NCO) 716. Although the digital transmit waveform is illustrated in FIG. 7 by TX logic 714, TX NCO 716 and charge pump 718, it should be understood that a transmit waveform can be generated in other ways. In some examples, the transmit waveform voltage amplitude values can be stored in a look-up table (LUT) and provided as digital codes based on the timing signal provided by TX NCO 716. Transmit circuitry 702 can also include a transmit digital-to-analog converter (TX DAC) 712. TX DAC 712 can be configured to receive the digital transmit waveform and generate an analog transmit waveform (also referred to herein as a stimulation signal). In some examples, TX DAC 712 can provide two output analog transmit waveforms having different phases. For example, a positive phase stimulation signal Vstim+ can be generated at a positive output of TX DAC 712, and a negative phase stimulation signal Vstim− can be generated at a negative output of TX DAC 712. Vstim+ can be a signal having a waveform at the same frequency as TX NCO 716, and Vstim− can be a signal with the waveform of Vstim+ that is inverted about a common voltage, Vcm. In some examples, the common voltage, Vcm, can be equal to 2.5V; Vstim+ can be a sine wave of frequency ω having a DC offset of 2.5V and a maximum amplitude of 4.75 V(Vstim+=2.5V+2.25V*sin (ωt)); and Vstim− can be a sine wave of frequency ω with a DC offset of 2.5 V and a maximum amplitude of 4.75 V, that is out of phase with Vstim+ by 180 degrees (Vstim−=2.5 V+2.25V*sin(ωt+180°)).

In some examples, other stimulation signals and signal generation methods could be used. For example, transmit circuitry 702 could include a mixer (not shown) to mix the sine wave Vstim+ and Vstim− signals above with an envelope waveform generated from an envelope look-up-table (LUT). The envelope shaping/windowing capability can be beneficial in that it allows control of the spectral properties of the stimulus waveform and also how much energy is put into the multi-touch panel. Both of these properties control the amount of interference rejection. In general, the more energy put into the panel the better the interference rejection toward external interferers. Examples of windowing functions are Gaussian, Chebyshev or Rectangular. Using, for example, a Chebyshev window vs. Rectangular window results in a stimulus waveform that, in the frequency domain, has reduced sideband ripple and therefore allows less noise to enter a receive channel after demodulation.

Vstim+ and Vstim− can be provided by TX DAC 712 to transmit channels 704 via separate lines of an analog bus 710 for example. Analog bus 710 can also include a line carrying the common voltage, Vcm, and a line that is grounded, GND. Each transmit channel 704 can include an analog multiplexer (MUX) 706 and an output buffer 708. Analog MUX 706 can receive as inputs stimulation signals including Vstim+, Vstim−, Vcm, and GND from analog bus 710 and can select one of Vstim+, Vstim−, Vcm, or GND to supply to as a drive signal to output buffer 708. TX DAC 712 can be, for example, a resistor-to-resistor (R2R) DAC, a capacitor-to-capacitor (C2C) DAC, a thermometer coded DAC, a sigma-delta DAC, or another type of DAC. Analog MUX 706 can select a drive signal based on a control signal from stimulus memory 720, as described in more detail below. Output buffers 708 of transmit channels 704 can provide the drive capability to drive the mostly capacitive load presented to them by a multi-touch sensor panel.

As discussed herein, location-based swing compensation can be applied to improve performance without reducing a touch sensing frequency and without unnecessarily consuming power by increasing signal level for all stimulation signals. As illustrated in FIG. 7, transmit channels 704 can also include regulators 709 to regulate the supply rails for output buffers 708. In some examples, each transmit channel 704 can have its own regulator 709, which can be set based on control signals from swing compensation memory 722, as discussed in more detail below. In some examples, regulator 709 can be provided only for channels in which swing compensation is required. Thus, in addition to providing drive capability for a capacitive load of a touch sensor panel, output buffers 708 and regulators 709 can provide variable gain (and thereby an adjusted voltage amplitude swing) to touch nodes of the touch sensor panel to compensate for location based mismatch for touch nodes.

During each step of a multi-step scan of a touch sensor panel (e.g., of touch screen 220), each analog MUX 706 can be configured to select one of Vstim+, Vstim−, Vcm, or GND for use by a corresponding transmit channel 704 to stimulate a corresponding touch node of the touch sensor panel. The selection can be made based on stimulation parameters in stimulus memory 720. For ease of illustration, as shown in FIG. 7, each shown row of stimulus memory 720 can correspond to one step in the multi-step scan, and the parameters in a row can specify the control signal for the analog MUX 706 to enable proper selections of drive signals for each transmit channel 704. For each step in the multi-step scan, the analog MUXs 706 can provide drive signals based on the parameters in a row of stimulus memory 720. For example, in the first step, the STEP 0 row in FIG. 7 specifies a signal selection for the analog MUX 706 of a first transmit channel (MUX0_SEL), a selection for the analog MUX 706 of the second transmit channel (MUX1_SEL), etc. At each step of the multi-step scan, the analog MUXs 706 can be configured to provide different signal combinations to stimulate the touch sensor panel according to the scan plan. Channel scan logic 210 (illustrated in FIG. 2) can control the timing of the steps by incrementing a step address stored in stimulus memory 720. Once the analog MUXs 706 select the drive signals, the drive signals can be output by buffers 708 of transmit channels 704 to stimulate touch nodes of the touch sensor panel. It should be understood that the representation of parameters stored in stimulus memory 720 is merely exemplary.

During each step of a multi-step scan of a touch sensor panel (e.g., of touch screen 220), each regulator 709 can be configured to set the voltage rails (and thereby the gain) of a corresponding output buffer 708 for use by a corresponding transmit channel 704 to stimulate a corresponding touch node of the touch sensor panel with an appropriate voltage swing to meet SNR requirements of the corresponding touch node. The selection can be made based on stimulation parameters in swing-compensation memory 722. For ease of illustration, as shown in FIG. 7, each shown row of swing-compensation memory 722 can correspond to one step in the multi-step scan, and the parameters in a row can specify the control signal for regulators 709 to enable proper swing of the drive voltages output by output buffer 708 for each transmit channel 704. For each step in the multi-step scan, the regulators 709 can provide supply voltages based on the parameters in a row of swing-compensation memory 722. For example, in the first step, the STEP 0 row in FIG. 7 specifies a supply voltage selection for the regulator 709 of a first TX channel (REG0_SEL), a supply voltage selection for the regulator 709 of the second TX channel (REG1_SEL), etc. At each step of the multi-step scan, the regulators 709 can be configured to provide appropriate power supplies to stimulate the touch sensor panel with appropriate swing drive signals (where the swing can be spatially dependent). Channel scan logic 210 (illustrated in FIG. 2) can control the timing of the steps by incrementing a step address stored in swing-compensation memory 722. It should be understood that the representation of parameters stored in swing-compensation memory 722 is merely exemplary. For example, in some examples, the parameters for controlling the voltage supply settings for regulators 709 can be the same for each scan step. In such examples, the swing-compensation memory 722 need not be adjusted on a per-step basis (e.g., only one row of parameters can be necessary). Additionally, in such examples, the regulator settings can alternatively be configured without the use of a memory (e.g., when the touch controller is designed for a specific association of drive/receive channels and sense nodes).

Figure 8:
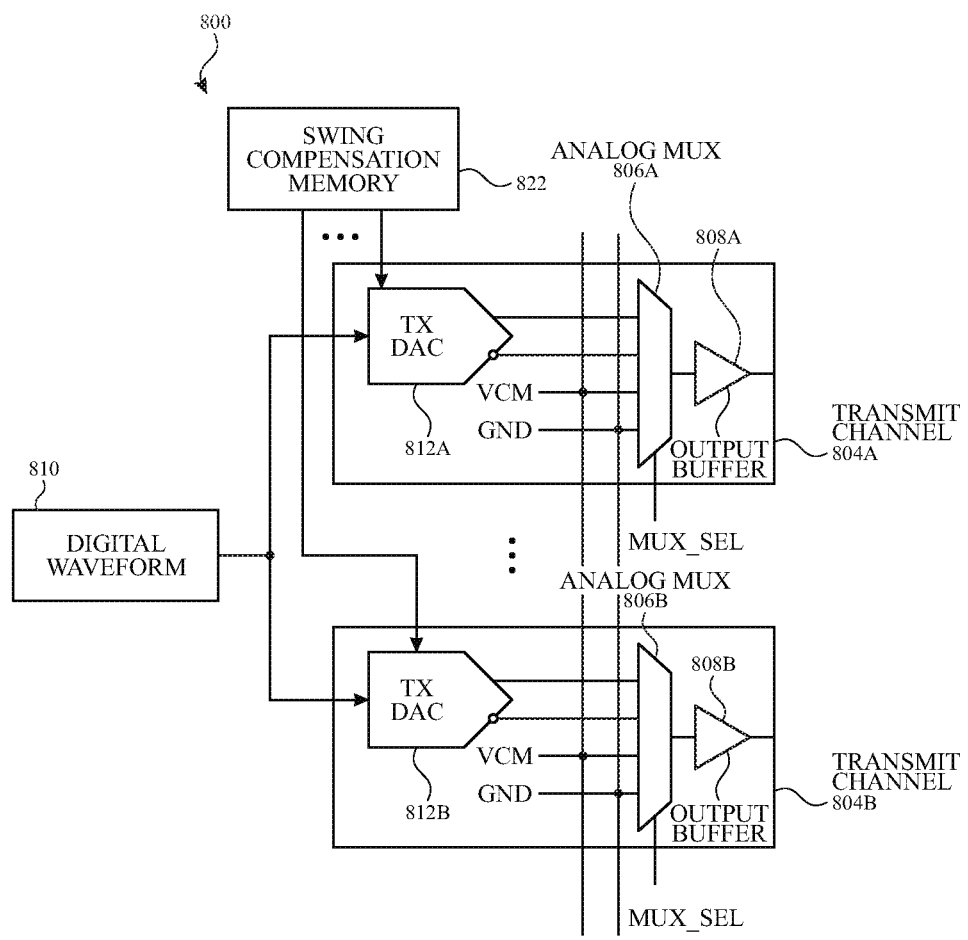
FIG. 8 illustrates another exemplary block diagram including components configured to implement location-based swing compensation according to examples of the disclosure.

In some examples, rather than using a separate regulator for each output buffer (which can introduce noise into the output due to the regulator supply and the supply of charge pump 718), a unity gain buffer (or an otherwise fixed gain buffer) can be used for output buffers 708, and each transmit channel 704 can provide location-based swing compensation using a plurality of DACs. For example, each transmit channel 704 can include a DAC, whose output swing can be adjusted using a swing control memory. FIG. 8 illustrates another exemplary block diagram including components configured to implement location-based swing compensation according to examples of the disclosure. Block diagram 800 illustrates two exemplary transmit channels 804A-B and swing compensation memory 822, though of course a touch controller may include additional transmit channels. Transmit channels 804A-B can include analog MUX 806A-B, output buffers 808A-B and TX DACs 812A-B, respectively. The operation of analog MUXs 806A-B can be similar to the operation of analog MUXs 706 (illustrated in FIG. 7). The operation of output buffers 808A-B can be similar to the operation of output buffers 708 (aside from omission of the regulator and adjustable supply voltages). Additionally, the generation of a digital waveform 810 can be similar to the generation of a digital transmit waveform discussed above with reference to FIG. 7. Unlike in FIG. 7, transmit channels 804A-B can include corresponding TX DACs 812A-B, which can adjust the swing of stimulation signals based on control signals from swing compensation memory 822. Thus, providing a transmit channel with a TX DAC can provide variable voltage amplitude (swing) stimulation signals (e.g., the voltage amplitude/swing of the stimulation signal output by transmit channel 804A can be different from the voltage amplitude/swing of the stimulation signal output by transmit channel 804B) to drive touch nodes of the touch sensor panel to compensate for location-based mismatch of touch nodes. During each step of a multi-step scan of a touch sensor panel (e.g., touch screen 220 illustrated in FIG. 2), each TX DAC (e.g., TX DACs 812A-B) can be configured to generate analog stimulation signals with a voltage swing appropriate for use by a corresponding transmit channel (e.g., transmit channel 804A-B, respectively) to stimulate a corresponding touch node of the touch sensor panel with an appropriate voltage swing to meet SNR requirements of the corresponding touch node. The selection can be made based on stimulation parameters in swing-compensation memory 822. The stimulation parameters in swing-compensation memory 822 can be similar to that of swing-compensation memory 722 (illustrated in FIG. 7), though the parameters may be DAC parameters rather than voltage regulator parameters.

Figure 9:
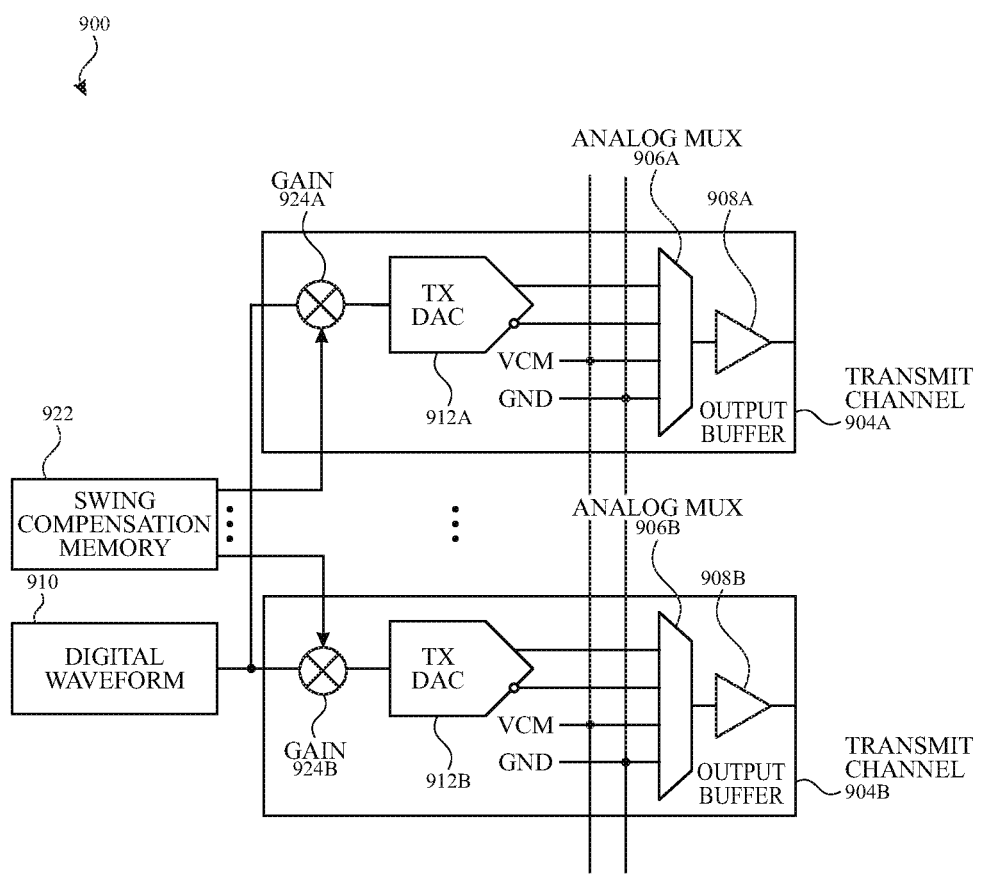
FIG. 9 illustrates another exemplary block diagram including components configured to implement location-based swing compensation according to examples of the disclosure.

In some examples, rather than implementing location-based swing compensation in the analog portion of a transmit channel, and each transmit channel can include a DAC whose digital input can be adjusted (e.g., using a swing control memory) to provide location-based swing compensation. FIG. 9 illustrates another exemplary block diagram including components configured to implement location-based swing compensation according to examples of the disclosure. Block diagram 900 illustrates two exemplary transmit channels 904A-B and swing compensation memory 922, though of course a touch controller may include additional transmit channels. Transmit channels 904A-B can include analog MUX 906A-B, output buffers 908A-B and a TX DACs 912A-B, respectively. The operation of analog MUXs 906A-B can be similar to the operation of analog MUXs 806A-B (illustrated in FIG. 8), the operation of output buffers 908A-B can be similar to the operation of output buffers 808A-B, and the operation of TX DACs 912A-B (aside from the omission of the adjusted swing) can be similar to the operation of TX DACs 812A-B. Additionally, the generation of a digital waveform 910 can be similar to the generation of a digital transmit waveform discussed above with reference to FIG. 7. Unlike in FIG. 8, transmit channels 904A-B can include corresponding gain circuits 924A-B, which can scale the digital waveform thereby adjusting the swing of the stimulation signals based on control signals from swing compensation memory 922. Thus, providing a transmit channel with a gain circuit to scale the transmit waveform can provide variable voltage amplitude swing stimulation signals (e.g., the voltage amplitude/swing of the stimulation signal output by transmit channel 904A can be different from the voltage amplitude/ swing stimulation signal output by transmit channel 804B) to drive touch nodes of the touch sensor panel to compensate for location-based mismatch of touch nodes. During each step of a multi-step scan of a touch sensor panel (e.g., of touch screen 220), each gain circuit (e.g., gain circuits 924A-B) can be configured to scale the digital waveform to generate analog stimulation signals at the output of a TX DAC (e.g., TX DAC 912A-912B, respectively) with a voltage swing appropriate for use by a corresponding transmit channel (e.g., transmit channel 904A-B, respectively) to stimulate a corresponding touch node of the touch sensor panel with an appropriate voltage swing to meet SNR requirements of the corresponding touch node. The scaling applied to the transmit waveform can be made based on stimulation parameters in swing-compensation memory 922. The stimulation parameters in swing-compensation memory 922 can be similar to that of swing-compensation memory 722 (illustrated in FIG. 7), though the parameters may be scaling parameters rather than voltage regulator parameters. In should be understood that instead of adjusting the scaling parameters, in some examples, each transmit channel can include its own circuitry to generate digital waveform 910 (rather than scaling a common digital transmit waveform).

As touch sensor panels increase in size, the number of touch nodes can increase and the routing distance can increase. As a result, more touch nodes (e.g., in particular those in the center of the touch sensor panel) can be subject to reduced bandwidth, and more swing compensation adjustments can be required. In some examples, to simplify the application of swing compensation, touch nodes of the touch sensor panel can be scanned in banks. The banks of touch nodes can be implemented with matched routing such that each touch node in a bank can have the same routing characteristics of a corresponding touch node in another bank. Due to matched routing, a transmit channel can apply the same swing compensation to a touch node with corresponding routing during different scan steps. As described above with respect to FIG. 7, such a configuration can simplify swing compensation memory 722 because the swing compensation for each channel can remain constant across multiple scan steps required to scan the banks of the touch sensor panel.

Figure 10:
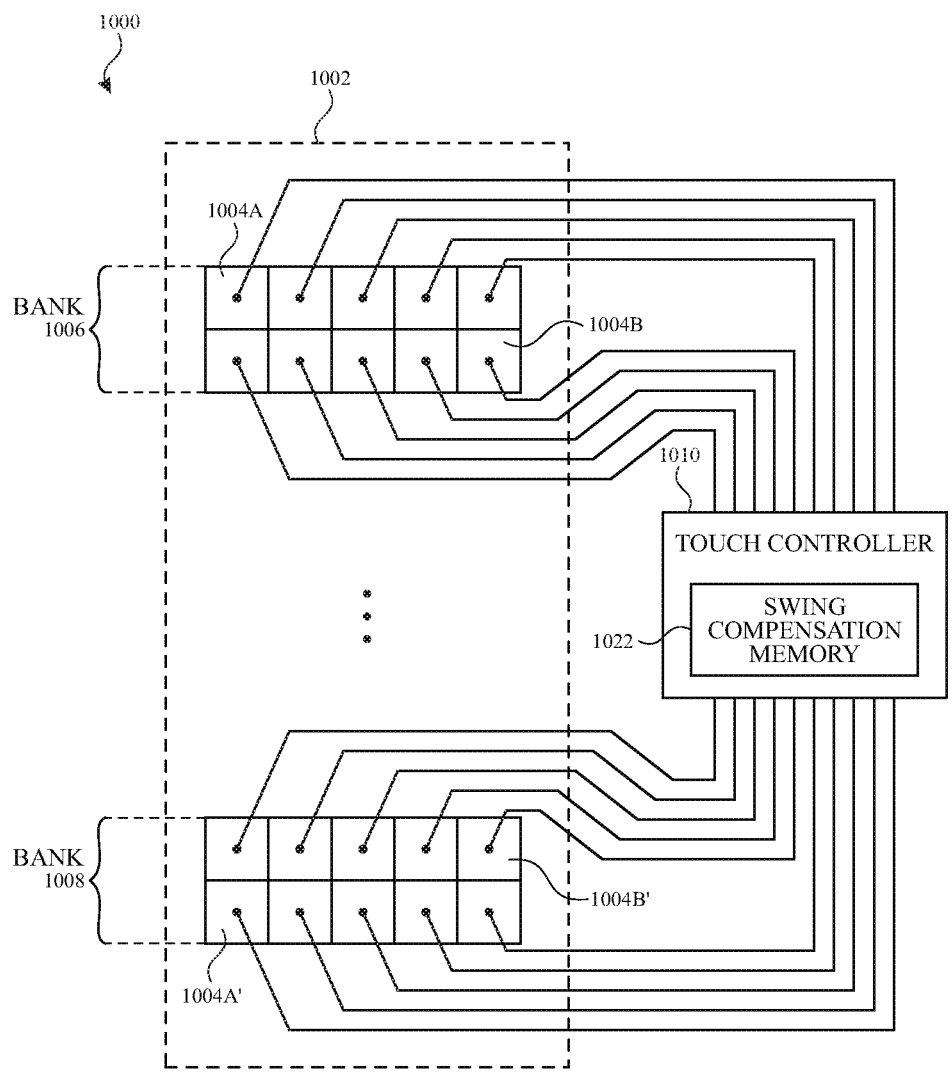
FIG. 10 illustrates an exemplary configuration for swing compensation for a touch sensor panel including matched routing according to examples of the disclosure.

FIG. 10 illustrates an exemplary configuration 1000 for swing compensation for a touch sensor panel 1002 including matched routing according to examples of the disclosure. Configuration 1000 can include a touch controller 1010 (e.g., corresponding to touch controller 206 in FIG. 2) and a touch sensor panel 1002 (e.g., corresponding to touch screen 220 in FIG. 2). Touch sensor panel 1002 can include an array of touch nodes (e.g., touch nodes 1004A, 1004A', 1004B, 1004B') arranged in banks. For example, a first bank 1006 illustrated in FIG. 10 can include ten touch nodes, and a second bank 1008 illustrated in FIG. 10 can similarly include ten touch nodes. Although not illustrated, the rest of touch sensor panel 1002 can be similarly divided into banks, for example. Each of the touch nodes in banks 1006 and 1008 can be routed to touch controller 1010 (and to transmit channels therein using switching circuits). Matched routing schemes can be used so that the routing characteristics can be matched between banks. For example, as illustrated in FIG. 10, touch node 1004A can be routed with a trace having the same length and geometry as corresponding touch node 1004A'. Similarly, touch node 1004B can be routed with a trace having the same length and geometry as corresponding touch node 1004B'. Likewise the remaining touch nodes in bank 1006 can routed to touch controller 1010 using matched routing. When a performing a touch sensing scan of bank 1006, each of the touch nodes can be coupled to a transmit channel, and each transmit channel can drive a corresponding touch node with a swing compensated drive signal according to parameters stored in swing compensation memory 1022 (e.g., as described above with reference to the transmit circuitry of FIGS. 7-9). When performing a touch sensing scan of bank 1008, each of the touch nodes can be coupled to a transmit channel, and each transmit channel can drive a corresponding touch node with a swing compensated drive signal according to parameters stored in swing compensation memory 1022. By coupling touch nodes in respective banks with a corresponding channel during banked scans of the respective bank, the same parameters can be used for swing compensation, without requiring a unique parameter per transmit channel and per scan.

Figure 11:
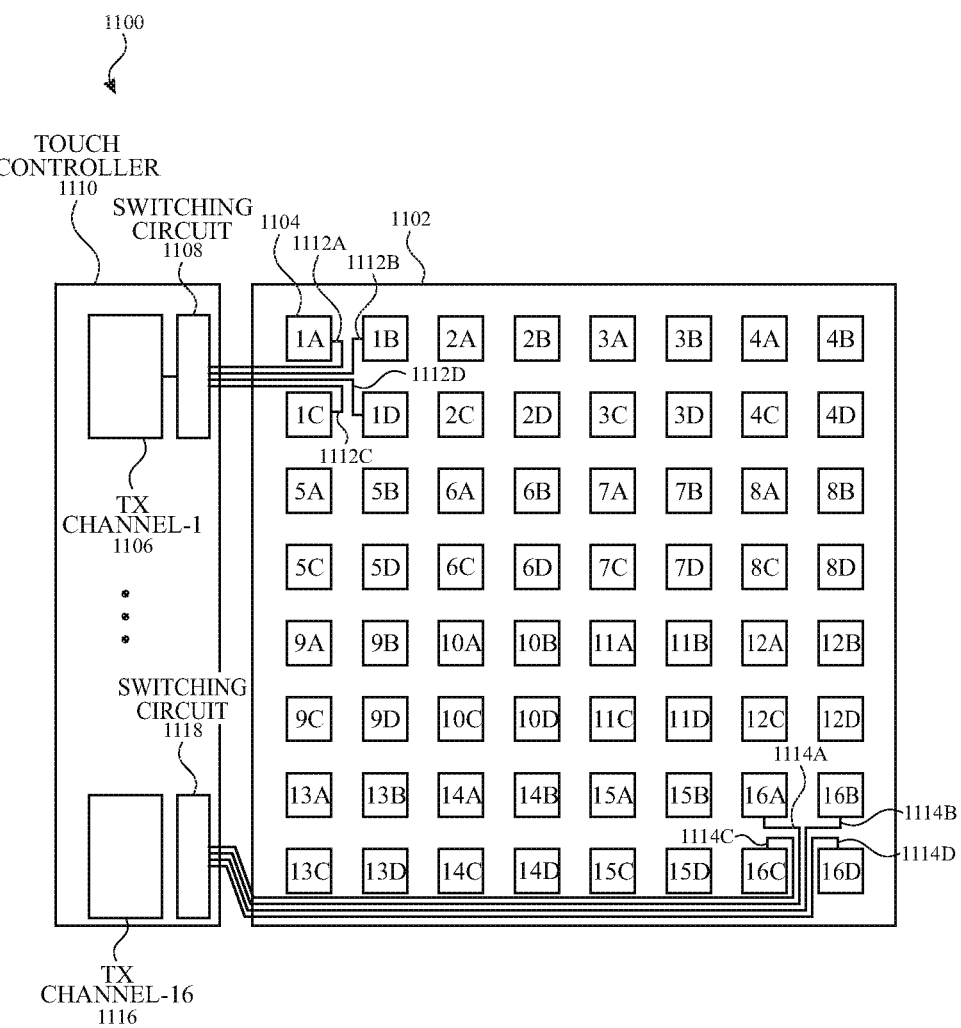
FIG. 11 illustrates another exemplary configuration for swing compensation for a touch sensor panel including matched routing according to examples of the disclosure.

FIG. 11 illustrates another exemplary configuration 1100 for swing compensation for a touch sensor panel 1102 including matched routing according to examples of the disclosure. Configuration 1100 can include a touch controller 1110 (e.g., corresponding to touch controller 206 in FIG. 2) and a touch sensor panel 1102 (e.g., corresponding to touch screen 220 in FIG. 2). Touch sensor panel 1102 can include an array of touch nodes 1104 arranged in banks. For example, a first bank illustrated in FIG. 11 can include sixteen touch nodes labeled A (1A-16A); a second bank can include sixteen touch nodes labeled B (1B-16B); a third bank can include sixteen touch nodes labeled C (1C-16C); and a fourth bank can include sixteen touch nodes labeled D (1D-16D). Each of the touch nodes in the banks can be routed to touch controller 1110. For example, FIG. 11 illustrates touch nodes 1A-1D and 16A-16D routed to touch controller 1110. The remaining touch nodes can be similarly routed to touch controller 1110. Each of the touch nodes in a bank can be coupled to a corresponding transmit channel in the touch controller via switching circuitry. For example, touch node 1A can be coupled to transmit channel 1106 by switching circuit 1108, and touch node 16A can be coupled to transmit channel 1116 by switching circuit 1118 during a scan of a bank A. Likewise the remaining touch nodes in bank A (2A-15A) can similarly be coupled to transmit channels during a scan of bank A. In a similar manner, touch nodes in bank B (1B-16B) can be coupled by switching circuitry to transmit channels during a scan of bank B; touch nodes in bank C (1C-16C) can be coupled by switching circuitry to transmit channels during a scan of bank C; and touch nodes in bank D (1D-16D) can be coupled by switching circuitry to transmit channels during a scan of bank D. Due to the spatial proximity of touch nodes 1A-1D (e.g., touch nodes 1A-1D can be adjacent to each other), routing traces between touch nodes 1A-1D can be matched fairly easily. Likewise, the spatial proximity of groups of four electrodes labeled with a common number (e.g., 6A-6D) can be routed with matched routing. When a performing a touch sensing scan of bank A, each of the touch nodes can be coupled to a transmit channel, and each transmit channel can drive a corresponding touch node with a swing compensated drive signal according to parameters stored in a swing compensation memory (e.g., as described above with reference to the transmit circuitry of FIGS. 7-10). When performing a touch sensing scan of banks B, C, and D, respectively, each of the touch nodes can be coupled to a transmit channel, and each transmit channel can drive a corresponding touch node with a swing compensated drive signal according to parameters stored in a swing compensation memory. By coupling touch nodes in respective banks with a corresponding channel during banked scans of the respective bank, the same parameters can be used for swing compensation, without requiring a unique parameter per transmit channel and per scan. For example, transmit channel 1116 can have a common swing compensation parameter stored in memory for transmit channel 1116 to compensate the drive signal applied to touch nodes 16A-D during respective scans of banks A-D.

Figure 12:
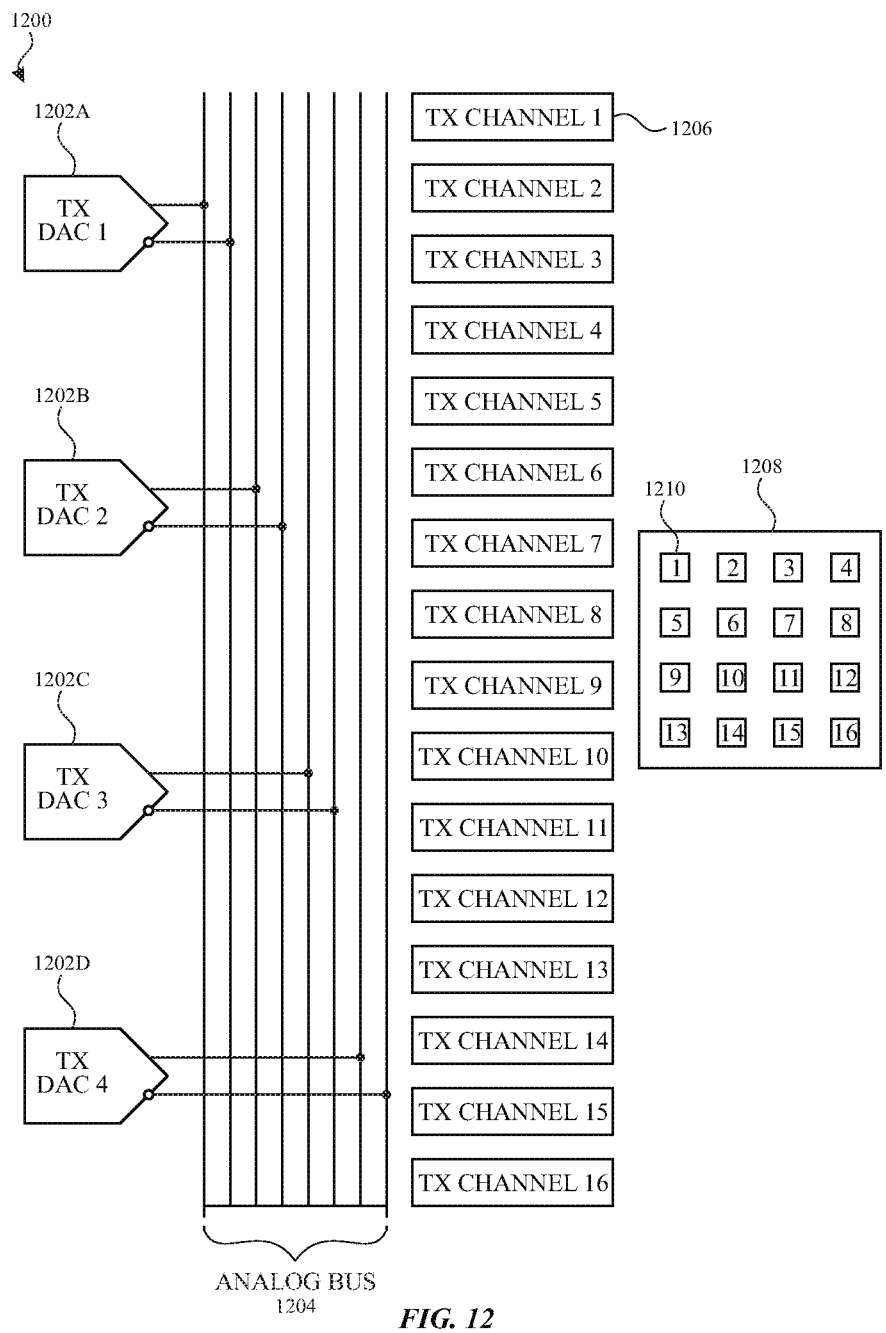
FIG. 12 illustrates an exemplary block diagram including components configured to implement location-based swing compensation according to examples of the disclosure.

It should be understood that although many of the examples herein include the ability to provide individual swing compensation for each transmit channel, in some examples, swing compensation can be applied more coarsely. FIG. 12 illustrates an exemplary block diagram 1200 including components configured to implement location-based swing compensation according to examples of the disclosure. Block diagram 1200 illustrates sixteen exemplary transmit channels 1206 (e.g., corresponding to transmit channels 804A-B illustrated in FIG. 8). Unlike FIG. 7 which includes one TX DAC 712 for the transmit channels or FIG. 8 which includes one TX DAC 812A-B per transmit channel, in FIG. 12, the sixteen transmit channels can share multiple TX DACs (e.g., TX DACs 1202A-D) configured to generate different stimulation signal swings. During operation, stimulation signals having different swing can be coupled to one or more transmit channels to compensate for routing differences. For example, when driving and sensing touch nodes 1210 labeled 6, 7 10 and 11 in FIG. 12, touch nodes 1210 labeled 1-5, 8, 9 and 12-16 in FIG. 12 can be driven so as to fully bootstrap touch sensor panel 1208. (It should be understood that an arbitrary number of touch nodes can be sensed, and an arbitrary number of touch nodes can be bootstrapped dependent on the number of touch nodes, transmit/sense channels and scanning operation.). Some of the touch nodes 1210 can be stimulated by one or more transmit channels 1206 applying stimulation signals having voltage amplitudes corresponding to TX DAC 1202A; some touch nodes 1210 can be stimulated by one or more transmit channels 1206 applying stimulation signals having voltage amplitudes corresponding to TX DAC 1202B; some touch nodes 1210 can be stimulated by one or more transmit channels 1206 applying stimulation signals having voltage amplitudes corresponding to TX DAC 1202C; and some touch nodes 1210 can be stimulated by one or more transmit channels applying stimulation signals having voltage amplitudes corresponding to TX DAC 1202D. Although swing compensation in such a configuration may not be able to apply swing compensation on a per channel basis, the availability of multiple swing compensation options can reduce the non-uniform response due to routing differences for a touch sensor panel.

In some examples, each of TX DACs 1202A-D can be coupled to analog bus 1204 and be thereby coupled to each of the transmit channels 1206 by switching circuitry (not shown). In some examples, each of the TX DACs can be coupled to a subset of the transmit channels. For example, if a transmit channel is coupled during operation to a group of touch nodes with similar routing characteristics, swing compensation may not require more than one TX DAC be coupled to that transmit channel. Another transmit channel can be coupled during operation to a group of touch nodes with different routing characteristics, such that swing compensation can be improved by coupling more than one TX DAC to that transmit channel. In some examples, the switching circuitry can dynamically change the coupling of TX DACs and transmit channels. For example, TX DAC 1202A can be coupled to TX Ch. 1 and TX Ch. 11, but at different times.

Figure 13:
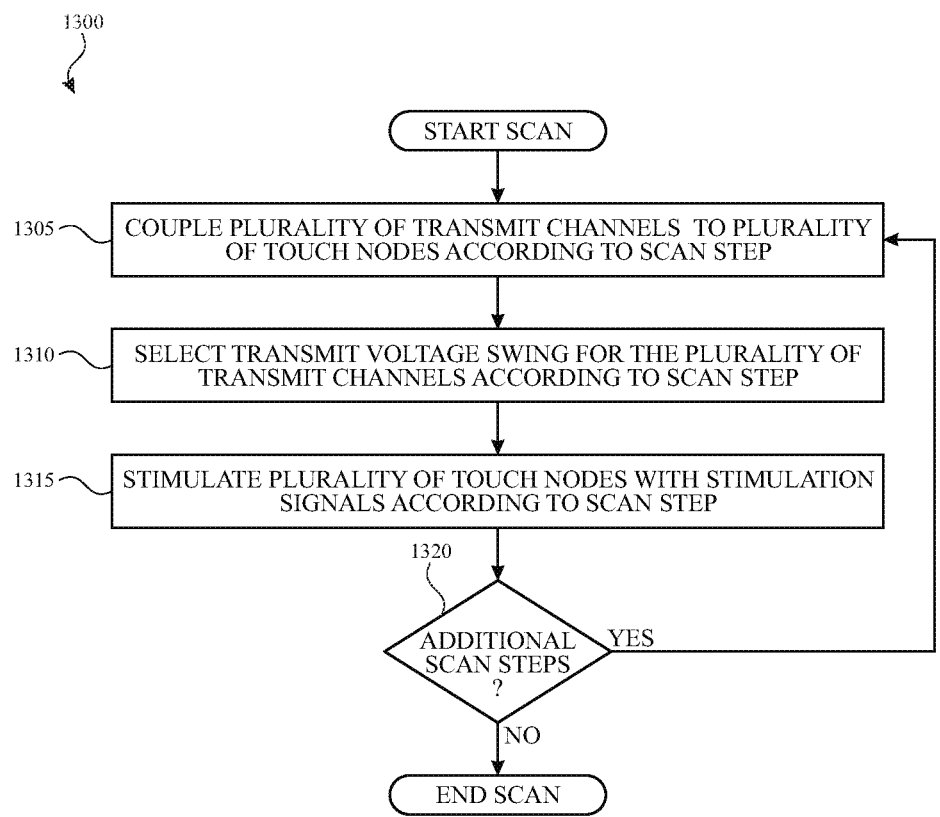
FIG. 13 illustrates an exemplary process for a touch sensing scan including location-based swing compensation according to examples of the disclosure.

FIG. 13 illustrates an exemplary process 1300 for a touch sensing scan including location-based swing compensation according to examples of the disclosure. The touch sensing scan can include multiple scan steps. In each of the multiple scan steps, a subset of the touch nodes of a touch sensor panel can be sensed. At 1305, a touch sensing system (e.g., touch controller 206 illustrated in FIG. 2) can couple a plurality of transmit channels with a plurality of touch nodes according to a scan step. For example, as illustrated in FIG. 11, touch nodes 1A-16A can be coupled to sixteen transmit channels in a first scan step (scan step A). At 1310, the touch sensing system can select a transmit voltage swing for each of the plurality of transmit channels according to the scan step. For example, the touch sensing system can include a swing compensation memory storing parameters to adjust the amplitude of the stimulation signals to compensate for the non-uniform characteristics of the touch nodes (e.g., according to the description above with respect to FIGS. 7-12). In some examples, a touch sensor panel can be characterized to determine the voltage swing required to generate a uniform signal (and therefore, a uniform SNR) for each touch node. The characterization can be based in part on touch node location and/or routing trace length and geometry. The characterization can be used to determine voltage swing adjustments that can be stored as voltage swing parameters in the swing compensation memory. In some examples, a unique swing compensation parameter can be stored for each touch node and applied to the touch nodes in multiple steps (e.g., swing compensation memory can include parameters indexed according to scan step and transmit channel). In some examples, the touch nodes can be divided into banks with matched routing (e.g., as discussed above with respect to FIGS. 10 and 11), and the channel specific swing compensation parameters can be stored and applied in each of the multiple steps (e.g., swing compensation memory can include parameters indexed according to transmit channel). At 1315, the touch sensing system can stimulate the plurality of touch nodes with stimulation signals according to the scan step. The swing of the stimulation signals (e.g., including Vstim+ and/or Vstim−) can be compensated according to the swing compensation parameters in swing compensation memory in order to reduce the non-uniformity of the touch sensing measurements (and to improve the cancellation benefit of bootstrapping). At 1320, the touch sensing system can determine whether there are additional scan steps to perform. If yes, the touch sensing system can perform a scan of a different plurality of touch nodes using the same or a different swing compensation (e.g., at 1305). If no, the touch sensing scan can be concluded.

Figure 14:
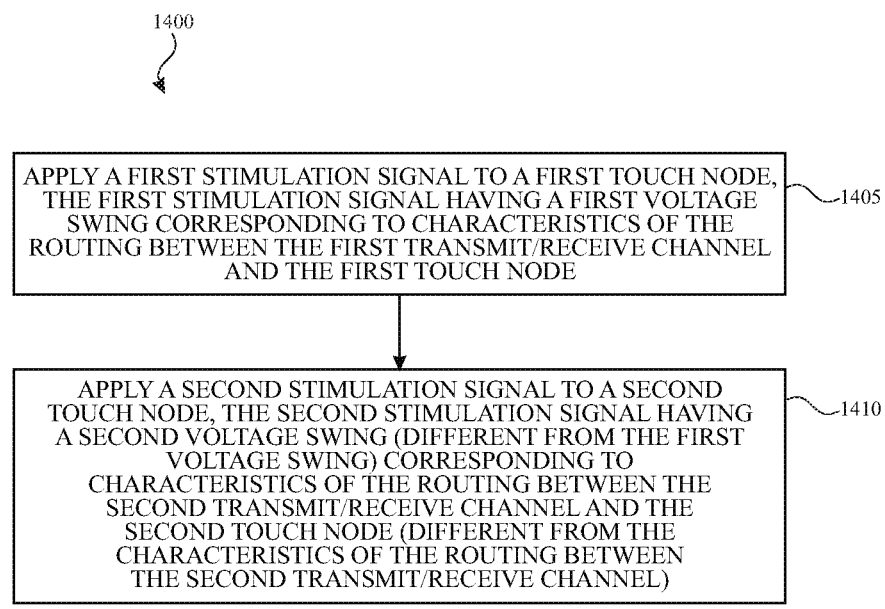
FIG. 14 illustrates an exemplary process for a touch sensing scan including location-based swing compensation according to examples of the disclosure.

FIG. 14 illustrates an exemplary process 1400 for a touch sensing scan including location-based swing compensation according to examples of the disclosure. At 1405, the touch sensing system (e.g., touch controller 206 illustrated in FIG. 2) can apply a first stimulation signal to a first touch node of a touch sensor panel. The first stimulation signal can have a first voltage swing. The first voltage swing can correspond to characteristics of the routing between a first transmit/receive channel (e.g., corresponding to drive/sense channel 208 illustrated in FIG. 2) and the first touch node (e.g., touch node 222 illustrated in FIG. 2). The characteristics can include the length of the routing and/or the geometry (e.g., thickness) of the routing. At 1410, the touch sensing system can apply a second stimulation signal to a second touch node of a touch sensor panel. The second stimulation signal can have a second voltage swing. The second voltage swing can correspond to characteristics of the routing between a second transmit/receive channel and the second touch node. The characteristics can include the length of the routing and/or the geometry (e.g., thickness) of the routing. In some examples, the second voltage swing and the first voltage swing can be different due to corresponding differences between the respective routing characteristics. For example, the second voltage swing can be increased relative to the first voltage swing when the routing between the second transmit/receive channel and the second touch node is longer and/or thinner than the routing between the first transmit/receive channel and the first touch node. In some examples, the second voltage swing and the first voltage swing can be the same due to the same or similar routing characteristics.

Although primarily discussed in the context of a pixelated self-capacitance touch sensor panel, it should be understood that location-based swing compensation as described herein can be applied to other touch sensor panel configuration. For example, a row-column touch sensor panel configured to perform mutual capacitance or self-capacitance touch sensing scans can also apply location-based swing compensation to account for routing differences between transmit channels and drive electrode (for mutual capacitance) or to account for routing differences between drive/sense channels and corresponding row and/or column electrodes (for self-capacitance). Additionally, although self-capacitance scanning is described primarily based on the configuration of FIG. 3A, it should be understood that location-based swing compensation can be applied for touch sensor panels implementing self-capacitance scanning using a switched capacitor implementation.

In some examples, swing adjustment parameters can be different based on the selected operating frequency of the touch sensing operation, temperature of the device and/or age of the device. In some examples, the swing compensation memory can store multiple parameters corresponding to the various operating frequencies, temperatures and/or age of the device. In some examples, a scaling parameter can be provided to modify the swing compensation parameters to account for operating frequency, temperature and/or age. For example, when operating at a relatively low frequency, swing compensation may be reduced or disabled because the device can be operating within the bandwidth of even the "worst case" touch node. In some examples, operating temperature and aging can impact the bandwidth characteristics of the routing traces and/or touch sensors. In such examples, the swing compensation parameters can be adjusted based on age or temperature (e.g., measured by a temperature sensor in the device proximate to the touch sensor panel).

Thus, the examples of the disclosure provide various ways to implement location-based swing compensation to improve performance of touch sensing (e.g., by improved uniformity of SNR across touch nodes of the touch sensor panel) in a power efficient manner and without requiring a reduction in operating frequency.

Therefore, according to the above, some examples of the disclosure are directed to an apparatus for stimulating a plurality of touch nodes. The apparatus can comprise: one or more digital waveform generators configured to generate one or more digital waveforms; and a plurality of transmit channels configured to receive one or more control signals and output a plurality of drive signals. Each transmit channel can include a multiplexer configured to select an input signal from a plurality of input signals, at least one of the plurality of input signals generated based on at least one of the one or more digital waveforms; and an output buffer configured to drive one of the plurality of touch nodes with one of the plurality of drive signals, the one of the plurality of drive signals corresponding to the selected input signal. At least two of the plurality of drive signals having the same phase can include different voltage amplitudes. Additionally or alternatively, in some examples, the apparatus can further comprising: a digital-to-analog converter configured, for each transmit channel, to transmit the plurality of input signals to the multiplexer. The plurality of input signals can include first and second signals having the same amplitude and different phase. Additionally or alternatively, in some examples, at least one of the plurality of transmit channels can include: a regulator configured to provide a variable gain to the output buffer, the variable gain based on at least one of the one or more control signals. Additionally or alternatively, in some examples, the apparatus can further comprise: a plurality of regulators. Each regulator can configured to provide a variable gain. Each regulator can be coupled to a unique output buffer. Additionally or alternatively, in some examples, the apparatus can further comprise: a memory configured to transmit the one or more control signals and store one or more of stimulation parameters, step addresses, one or more compensation parameters, and the one or more control signals. Additionally or alternatively, in some examples, each transmit channel can further include: a digital-to-analog converter configured to: output at least one of the plurality of input signals to the multiplexer, and adjust an amplitude of the one of the plurality of drive signals based on at least one of the one or more control signals. Additionally or alternatively, in some examples, each transmit channel can further include: a gain circuit configured to adjust a plurality of stimulation signals, and a digital-to-analog converter configured to generate at least one of the plurality of input signals based on the adjusted plurality of stimulation signals. Additionally or alternatively, in some examples, each transmit channel can include: one of the digital waveform generators, unique from digital waveform generators in other transmit channels. Additionally or alternatively, in some examples, the apparatus can further comprise: a plurality of digital-to-analog converters. At least two of the plurality of transmit channels can both be coupled to at least two of the same digital-to-analog converters. Additionally or alternatively, in some examples, the apparatus can further comprise: a digital-to-analog converter coupled to at least two of the plurality of transmit channels.

Some examples of the disclosure are directed to a method. The method can comprise: selecting a plurality of stimulation voltage swings for a plurality of transmit channels in accordance with a plurality of voltage swing parameters, the plurality of stimulation voltage swings including at least two different stimulation voltage swings, a respective voltage swing parameter corresponding to an impedance characteristic of a respective touch node of a plurality of touch nodes, the impedance characteristic based at least in part on routing between a transmit channel and the respective touch node; stimulating the plurality of touch nodes coupled to the plurality of transmit channels with a plurality of stimulation signals, a respective stimulation signal of the plurality of stimulation signals applied to the respective touch node having a respective stimulation voltage swing corresponding to the respective voltage swing parameter; and sensing one or more of the plurality of touch nodes to detect one or more changes in capacitance corresponding to an object touching or in proximity to the one or more sensed touch nodes. Additionally or alternatively, in some examples, selecting the plurality of stimulation voltage swings can comprise: for each transmit channel, selecting a stimulation voltage swing according to a unique voltage swing parameter corresponding to the transmit channel. Additionally or alternatively, in some examples, selecting the plurality of stimulation voltage swings can comprise: for at least two transmit channels, selecting a stimulation signal with the same stimulation voltage swing. Additionally or alternatively, in some examples, the method can further comprise: scaling the plurality of stimulation voltage swings based on one or more of an operating frequency of touch sensing, temperature of a device, or age of the device, the device including the plurality of touch nodes. Additionally or alternatively, in some examples, the method further comprising: determining whether an operating frequency of touch sensing is below a threshold; and in accordance with the determination that the operating frequency of touch sensing is below the threshold, selecting a common stimulation voltage swing for the plurality of transmit channels. Some examples of the disclosure are directed to a non-transitory computer readable storage medium storing instructions, which when executed by a device comprising one or more processors, can cause the one or more processors to perform any of the above methods.

Some examples of the disclosure are directed to a non-transitory computer readable storage medium. The non-transitory computer readable storage medium can store instructions, which when executed by a device comprising touch nodes and one or more processors, can cause the one or more processors to: in a first scan step: couple, a plurality of transmit channels to a first plurality of the touch nodes; select, based on a first plurality of voltage swing parameters, a first plurality of stimulation voltage swings for the plurality of transmit channels, a respective voltage swing parameter of the first plurality of voltage swing parameters corresponding to an impedance characteristics of a respective touch node of the first plurality of touch nodes, the impedance characteristic based at least in part on routing between a first respective transmit channel and the respective touch node; and stimulate the first plurality of touch nodes with first stimulation signals, a respective stimulation signal of the first stimulation signals applied to the respective touch node of the first plurality of touch nodes having a respective first stimulation voltage swing corresponding to the respective voltage swing parameter of the first plurality of voltage swing parameters; and in a second scan step: couple, the plurality of transmit channels to a second plurality of the touch nodes; select, based on a second plurality of voltage swing parameters, a second plurality of stimulation voltage swings for the plurality of transmit channels, a respective voltage swing parameter of the second plurality of voltage swing parameters corresponding to an impedance characteristics of a respective touch node of the second plurality of touch nodes, the impedance characteristic based at least in part on routing between a second respective transmit channel and the respective touch node; and stimulate the second plurality of touch nodes with second stimulation signals, a respective stimulation signal of the second stimulation signals applied to the respective touch node of the second plurality of touch nodes having a respective second stimulation voltage swing corresponding to the respective voltage swing parameter of the second plurality of voltage swing parameters. Additionally or alternatively, in some examples, the first plurality of voltage swing parameters can be the same as the second plurality of voltage swing parameters. Additionally or alternatively, in some examples, the first plurality of voltage swing parameters can be different than the second plurality of voltage swing parameters. Additionally or alternatively, in some examples, selecting the first plurality of stimulation voltage swings can comprise: for each transmit channel, selecting a stimulation voltage swing according to a unique voltage swing parameter corresponding to the transmit channel. Additionally or alternatively, in some examples, the instructions can further cause the one or more processors to scale the first plurality of stimulation voltage swings based on one or more of an operating frequency of touch sensing, age of the device, and temperature of the device.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. An apparatus for stimulating a plurality of touch nodes, the apparatus comprising:
one or more digital waveform generators configured to generate one or more digital waveforms; and
a plurality of transmit channels configured to receive one or more control signals and output a plurality of drive signals, each transmit channel including:
a multiplexer configured to select an input signal from a plurality of input signals, at least one of the plurality of input signals generated based on at least one of the one or more digital waveforms;
an output buffer configured to drive one of the plurality of touch nodes with one of the plurality of drive signals, the one of the plurality of drive signals corresponding to the selected input signal, wherein a voltage amplitude of the one of the plurality of drive signals was set via a gain circuit, separate from the output buffer, configured to scale a voltage amplitude of one or more stimulation signals; and
a digital-to-analog converter configured to generate at least one of the plurality of input signals based on the scaled plurality of stimulation signals;
wherein at least two of the plurality of drive signals have the same phase and different voltage amplitudes.

2. The apparatus of claim 1, further comprising:
a digital-to-analog converter configured, for each transmit channel, to transmit the plurality of input signals to the multiplexer.

3. The apparatus of claim 1, further comprising:
a memory configured to transmit the one or more control signals and store one or more of stimulation parameters, step addresses, one or more compensation parameters, and the one or more control signals.

4. The apparatus of claim 1, wherein each transmit channel includes:
one of the digital waveform generators, unique from digital waveform generators in other transmit channels.

5. The apparatus of claim 1, further comprising:
a plurality of digital-to-analog converters, wherein at least two of the plurality of transmit channels are both coupled to at least two of the same digital-to-analog converters.

6. The apparatus of claim 1, further comprising:
a digital-to-analog converter coupled to at least two of the plurality of transmit channels.

7. The apparatus of claim 1, wherein:
a voltage amplitude of the first drive signal is based on a first control signal of the one or more control signals; and
a voltage amplitude of the second drive signal is based on a second control signal of the one or more control signals, different from the first control signal.

8. The apparatus of claim 1, wherein the plurality of drive signals includes a third drive signal having a different phase and a different amplitude than the first and second drive signals.

9. A method comprising:
selecting a plurality of stimulation voltage swings for a plurality of transmit channels in accordance with a plurality of voltage swing parameters, wherein the plurality of stimulation voltage swings includes at least two different stimulation voltage swings, wherein a respective voltage swing parameter corresponds to an impedance characteristic of a respective touch node of a plurality of touch nodes, the impedance characteristic based at least in part on routing between a transmit channel and the respective touch node;
stimulating the plurality of touch nodes coupled to the plurality of transmit channels with a plurality of stimulation signals, wherein a respective stimulation signal of the plurality of stimulation signals applied to the respective touch node has a respective stimulation voltage swing corresponding to the respective voltage swing parameter;
sensing one or more of the plurality of touch nodes to detect one or more changes in capacitance corresponding to an object touching or in proximity to the one or more sensed touch nodes;
determining whether an operating frequency of touch sensing is below a threshold; and
in accordance with the determination that the operating frequency of touch sensing is below the threshold, selecting a common stimulation voltage swing for the plurality of transmit channels.

10. The method of claim 9, wherein selecting the plurality of stimulation voltage swings comprises:
for each transmit channel, selecting a stimulation voltage swing according to a unique voltage swing parameter corresponding to the transmit channel.

11. The method of claim 9, wherein selecting the plurality of stimulation voltage swings comprises:
for at least two transmit channels, selecting a stimulation signal with the same stimulation voltage swing.

12. The method of claim 9, further comprising:
scaling the plurality of stimulation voltage swings based on one or more of an operating frequency of touch sensing, temperature of a device, or age of the device, the device including the plurality of touch nodes.

13. The method of claim 9, wherein:
the first stimulation voltage swing is based on a first control signal of one or more control signals; and
the second stimulation voltage swing is based on a second control signal of one or more control signals, different from the first control signal.

14. A non-transitory computer readable storage medium storing instructions, which when executed by a device comprising touch nodes and one or more processors, cause the one or more processors to:
in a first scan step:
couple, a plurality of transmit channels to a first plurality of the touch nodes;
select, based on a first plurality of voltage swing parameters, a first plurality of stimulation voltage swings for the plurality of transmit channels, wherein the plurality of stimulation voltage swings includes at least two different stimulation voltage swings, wherein a respective voltage swing parameter of the first plurality of voltage swing parameters corresponds to an impedance characteristic of a respective touch node of the first plurality of touch nodes, the impedance characteristic based at least in part on routing between a first respective transmit channel and the respective touch node; and stimulate the first plurality of touch nodes coupled to the plurality of transmit channels with first stimulation signals, wherein a respective stimulation signal of the first stimulation signals applied to the respective touch node has a respective first stimulation voltage swing corresponding to the respective voltage swing parameter; and in a second scan step:
couple, the plurality of transmit channels to a second plurality of the touch nodes;
select, based on a second plurality of voltage swing parameters, a second plurality of stimulation voltage swings for the plurality of transmit channels, wherein the plurality of stimulation voltage swings includes at least two different stimulation voltage swings, wherein a respective voltage swing parameter of the second plurality of voltage swing parameters corresponds to an impedance characteristic of a respective touch node of the second plurality of touch nodes, the impedance characteristic based at least in part on routing between a second respective transmit channel and the respective touch node; and
stimulate the second plurality of touch nodes coupled to the plurality of transmit channels with second stimulation signals, wherein a respective stimulation signal of the second stimulation signals applied to the respective touch node has a respective second stimulation voltage swing, different than the respective first stimulation voltage swing, corresponding to the respective voltage swing parameter;

determining whether an operating frequency of touch sensing is below a threshold; and in accordance with the determination that the operating frequency of touch sensing is below the threshold, selecting a common stimulation voltage swing for the plurality of transmit channels.

15. The non-transitory computer readable storage medium of claim 14, wherein the first plurality of voltage swing parameters are different than the second plurality of voltage swing parameters.

16. The non-transitory computer readable storage medium of claim 14, wherein selecting the first plurality of stimulation voltage swings comprises:

for each transmit channel, selecting a stimulation voltage swing according to a unique voltage swing parameter corresponding to the transmit channel.

17. The non-transitory computer readable storage medium of claim 14, the instructions, when executed, further cause the one or more processors to:

scale the first plurality of stimulation voltage swings based on one or more of an operating frequency of touch sensing, age of the device, and temperature of the device.

18. The non-transitory computer readable storage medium of claim 14, wherein:

during the first scan step, the respective first stimulation voltage swing is based on a first control signal of one or more control signals; and during the second scan step, the respective second stimulation voltage swing is based on the first control signal of the one or more control signals.

\* \* \* \* \*